US 6,542,633 B1

(12) United States Patent
Kori

(10) Patent No.: US 6,542,633 B1
(45) Date of Patent: Apr. 1, 2003

(54) IMAGE FORMING SYSTEM WITH CAPABILITY FOR COLOR CORRECTION

(75) Inventor: Shinichiro Kori, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/182,453

(22) Filed: Oct. 30, 1998

(30) Foreign Application Priority Data

Oct. 31, 1997 (JP) .............................................. 9-300208
Jun. 16, 1998 (JP) ........................................... 10-168750

(51) Int. Cl.⁷ ................................................ G06K 9/00
(52) U.S. Cl. ....................... 382/167; 382/251; 382/252; 358/515; 358/518; 358/521
(58) Field of Search ................................. 382/162, 167, 382/251, 252; 358/1.9, 1.15, 502, 518, 505, 523, 515, 521, 456, 458

(56) References Cited

U.S. PATENT DOCUMENTS

| | | | | |
|---|---|---|---|---|
| 5,377,041 A | * | 12/1994 | Spaulding et al. | 358/518 |
| 5,508,826 A | * | 4/1996 | Lloyd et al. | 358/501 |
| 5,642,202 A | * | 6/1997 | Williams et al. | 358/406 |
| 5,649,072 A | * | 7/1997 | Balasubramanian | 358/1.9 |
| 5,652,831 A | * | 7/1997 | Huang et al. | 395/131 |
| 5,761,394 A | * | 6/1998 | Sugiura et al. | 358/1.9 |
| 5,799,105 A | * | 8/1998 | Tao | 382/167 |
| 5,801,853 A | * | 9/1998 | Yamada et al. | 358/504 |
| 6,005,970 A | * | 12/1999 | Ohneda et al. | 382/162 |
| 6,048,117 A | * | 4/2000 | Banton | 400/120.09 |
| 6,204,932 B1 | * | 3/2001 | Haneda et al. | 358/1.9 |

FOREIGN PATENT DOCUMENTS

JP   08-331397   12/1996   ............ H04N/1/60

* cited by examiner

Primary Examiner—Phuoc Tran
Assistant Examiner—Ali Bayat
(74) Attorney, Agent, or Firm—Fitzpatrick, Cella, Harper & Scinto

(57) ABSTRACT

A color copy machine having a reading portion and a printing portion outputs a chart for color correction. A result of reading by the reading portion of the same machine of patch for each output color of the chart, is converted into color component data for a pixel. The color component data are summed for a number of pixels of the patches. Data is derived by dividing the sum by a number of pixels. With this data, content of a production color table used in the binarization process is updated. By this, the image to be printed by the printing portion on a basis of a result of reading of the reading portion, matches with the result of reading. As a result, the color of the original image can be reproduced with high fidelity.

15 Claims, 15 Drawing Sheets

| clr_cnt / tbl_cnt | 0 (CYAN) | 1 (MAGENTA) | 2 (YELLOW) | 3 (BLACK) |
|---|---|---|---|---|
| 0 (WHITE) | 0 | 0 | 0 | 0 |
| 1 (YELLOW) | 0 | 0 | 1 | 0 |
| 2 (MAGENTA) | 0 | 1 | 0 | 0 |
| 3 (RED) | 0 | 1 | 1 | 0 |
| 4 (CYAN) | 1 | 0 | 0 | 0 |
| 5 (GREEN) | 1 | 0 | 1 | 0 |
| 6 (BLUE) | 1 | 1 | 0 | 0 |
| 7 (BLACK) | 0 | 0 | 0 | 1 |

PRODUCTION COLOR TABLE 1(clr_tbl(tbl_cnt,clr_cnt))

*FIG.3A*

| p / clr_cnt | 0 | 1 | 2 | 3 | 4 | ... | 359 |
|---|---|---|---|---|---|---|---|
| 0 (CYAN) | 0 | 0 | 0 | 0 | 0 | ... | 0 |
| 1 (MAGENTA) | 0 | 0 | 0 | 0 | 0 | ... | 0 |
| 2 (YELLOW) | 0 | 0 | 0 | 0 | 0 | ... | 0 |
| 3 (BLACK) | 0 | 0 | 0 | 0 | 0 | ... | 0 |

OUTPUT BUFFER(clr_buf(clr_cnt,p))

*FIG.3B*

| rgb_cnt \ r | 0 | 1 | 2 | 3 | 4 | ... | 2879 |
|---|---|---|---|---|---|---|---|
| 0 (RED) | 0 | 0 | 0 | 0 | 0 | ... | 0 |
| 1 (GREEN) | 0 | 0 | 0 | 0 | 0 | ... | 0 |
| 2 (BLUE) | 0 | 0 | 0 | 0 | 0 | ... | 0 |

READ BUFFER(rgb_buf(rgb_cnt,r))

*FIG.6A*

| cmy_cnt \ q | 0 | 1 | 2 | 3 | 4 | ... | 2879 |
|---|---|---|---|---|---|---|---|
| 0 (CYAN) | 0 | 0 | 0 | 0 | 0 | ... | 0 |
| 1 (MAGENTA) | 0 | 0 | 0 | 0 | 0 | ... | 0 |
| 2 (YELLOW) | 0 | 0 | 0 | 0 | 0 | ... | 0 |

CONVERTED READ BUFFER(cmy_buf(cmy_cnt,q))

*FIG.6B*

| tbl_cnt \ cmy_cnt | 0 (CYAN) | 1 (MAGENTA) | 2 (YELLOW) |
|---|---|---|---|
| 0 (WHITE) | 0 | 0 | 0 |
| 1 (YELLOW) | 0 | 0 | 0 |
| 2 (MAGENTA) | 0 | 0 | 0 |
| 3 (RED) | 0 | 0 | 0 |
| 4 (CYAN) | 0 | 0 | 0 |
| 5 (GREEN) | 0 | 0 | 0 |
| 6 (BLUE) | 0 | 0 | 0 |
| 7 (BLACK) | 0 | 0 | 0 |

CMY SUMMING TABLE(cmy_stbl(tbl_cnt,cmy_cnt))
CMY AGGREGATION TABLE(cmy_tbl(tbl_cnt,cmy_cnt))
PRODUCTION COLOR TABLE 2(CMY_TBL(tbl_cnt,cmy_cnt))

*FIG.6C*

| p<br>clr_cnt | 0 | 1 | 2 | 3 | 4 | ... | 359 |
|---|---|---|---|---|---|---|---|
| 0 (CYAN) | 0 | 0 | 0 | 0 | 0 | ... | 0 |
| 1 (MAGENTA) | 0 | 0 | 0 | 0 | 0 | ... | 0 |
| 2 (YELLOW) | 0 | 0 | 0 | 0 | 0 | ... | 0 |
| 3 (BLACK) | 0 | 0 | 0 | 0 | 0 | ... | 0 |

PRINT BUFFER(wr_buf(clr_cnt,p))

FIG.9A

| cmy_cnt<br>tbl_cnt | 0 (CYAN) | 1 (MAGENTA) | 2 (YELLOW) |
|---|---|---|---|
| 0 (WHITE) | 0 | 0 | 0 |
| 1 (YELLOW) | 0 | 0 | 100 |
| 2 (MAGENTA) | 0 | 200 | 100 |
| 3 (RED) | 0 | 200 | 200 |
| 4 (CYAN) | 200 | 50 | 100 |
| 5 (GREEN) | 200 | 50 | 100 |
| 6 (BLUE) | 255 | 255 | 100 |
| 7 (BLACK) | 255 | 255 | 255 |

PRODUCTION COLOR TABLE 2
(CMY_TBL(tbl_cnt,cmy_cnt))

FIG.9B

| p<br>clr_cnt | 0 | 1 | 2 | 3 | 4 | ... | 2879 |
|---|---|---|---|---|---|---|---|
| 0 (CYAN) | 0 | 0 | 0 | 0 | 0 | ... | 0 |
| 1 (MAGENTA) | 0 | 0 | 0 | 0 | 0 | ... | 0 |
| 2 (YELLOW) | 0 | 0 | 0 | 0 | 0 | ... | 0 |
| 3 (BLACK) | 0 | 0 | 0 | 0 | 0 | ... | 0 |

ERROR BUFFER(err_buf(clr_cnt,p))

FIG.9C

IMAGE FORMING SYSTEM WITH CAPABILITY FOR COLOR CORRECTION

This application is based on Patent Application Nos. 300,208/1997 filed on Oct. 31, 1997 in Japan and 168,750/1998 filed on Jun. 16, 1998 in Japan, the content of which is incorporated hereinto by reference.

BACKGROUND OF THE INVENTION

1. Field of the Invention

The present invention relates to an image forming apparatus such as a color copying apparatus and a color correction method. More particularly, the invention relates to color correction performed in a color copy machine, a facsimile machine having a color copy function, or the like.

2. Description of the Related Art

Such color copy machine or facsimile machine integrally includes a reading system and a printing system. Conventionally, color correction for a color image output in these apparatus is typically performed in respective of the reading system and the printing system independently. For example, for the reading system, the color correction is performed by using a tool on a personal computer (hereinafter, also called "PC" simply) connected to the color copy machine or the like, using together with a color chart for color correction. On the other hand, also in the printing system, the color correction is performed by using the tool on the PC, similarly. On the basis of these color correction, total color correction is finally performed including the reading system and the printing system.

Not only in a printer but also in these copy machine and facsimile machine performing color output, the printing system using an ink-jet method has been generally used. This ink-jet method is designed to perform printing by forming dots on a printing paper with an ink by ejecting the ink toward the printing paper, and has an advantage in capability of printing on basically any printing paper as long as the ink can be fixed. For instance, a plain paper which is widely used in general, an OHP sheet coated an ink receptacle layer on a plastic sheet, a cloth and the like have been known to be usable.

As set forth above, in an ink-jet system, wide variation of printing medium can be used. In this point, variation of the printing medium which a user of the printer or the like wants to use for printing, is increasing. Even limiting for the case of using the plain paper, there are many kinds of plain paper. In this case, the plain papers of respective kinds are different in property on the ink, such as fixing ability of the ink.

The conventional color correction per se and the color correction which is performed in a color copy system employing a printing apparatus of the ink-jet method, have following problems.

The standard conventional color correction is independently performed for the reading system and the printing system, respectively. Therefore, the color correction performed by employing the tool on the PC or the like is relatively complicate and requires long time. Furthermore, since various tools for the color correction or charts for evaluation are used in the conventional color correction, a cost for performing the color correction may become relatively high.

Furthermore, when the total color correction for both of the reading system and the printing system in a final stage on the basis of the color correction performed individually in the reading system and the printing system, a process of the color correction is not so easy. In addition, a decrease of a throughput may be caused in outputting a color copy image due to such complicated color correction.

In addition to the problem encountered by the conventional color correction per se, as a problem in the color correction in the ink-jet copy system, there is a problem in the printing medium to be employed upon printing a patch used for the color correction. More specifically, when a kind of the printing medium on which the patch is printed is different, an ink absorbing property is also different in accordance with the kind of the printing medium. In this case, for example, when the patch used for the color correction is printed on the printing medium having a low ink absorbency, a coloring agent, such as dye or the like in the ink ejected for printing the patch does not penetrate into the printing medium to be remained in a shallow portion or on a surface of the printing medium. As a result, density read with respect to such patch becomes relatively high. Particularly, upon printing of the patch, a predetermined region of the patch is often printed at a duty of 100%. Therefore, a density difference depending upon an absorbing ability of the ink to the printing medium becomes significant. Furthermore, when the patch of blue as an intermediate color is output with a cyan ink and a magenta ink, for example, the foregoing duty becomes 200% to make difference of the density depending upon the absorbing ability of the ink to the printing medium more significant.

Further, as another factor to cause increasing of the density of the patch with respect to the absorbency of the ink set forth above, it is known that in the case of using the printing medium having the low absorbency in a direction perpendicular to the surface of the printing medium, the ink may spread along the surface of the printing medium instead of penetrating in a thickness direction of the printing medium to easily cause bleeding. As a result of this, the ink dot tends to cover entire pixel and thus tends to also make the density high.

It should be noted that when the printing medium having the high ink absorbency is used, the density tends to be lower. Even in this case, problem can be encountered in the color correction.

As set forth above, in the case that the read density of the patch becomes different depending upon the absorbing ability to the ink, and the color correction is performed by reflecting the read density as is on a process of color correction, at the lower ink absorbency of the printing medium to be used for printing of the patch, printing based on a result of the color correction may be performed with higher density than the essentially proper density or performed in different color. Particularly, the printing density the patch of the intermediate color, at which the duty normally becomes as high as 200%, becomes significantly high or cause the difference of color to degrade quality of the printed image where poor balance in the density or color in the overall printed image occurs.

SUMMARY OF THE INVENTION

An object of the present invention is to provide an image forming apparatus and a color correction method which can easily perform color correction in a short period by performing the color correction automatically.

Another object of the present invention is to provide an image forming apparatus and a color correction method in which printing with a predetermined production color is performed by a printing portion of the image forming apparatus, a printed image of the predetermined production color is read by a reading portion of the same image forming apparatus, and content stored in a table which is used for printing of a color image is updated with a color component obtained based on a read result by the reading portion so as to perform color correction, so that an image printed by the printing portion based on a result read by the reading portion which has been subjected to the color correction can match an image read by the reading portion and thereby a color of an original image can be faithfully reproduced.

A further object of the present invention is to provide an image forming apparatus and a color correction method which can easily perform color correction in a short period by automatically performing the color correction and can perform printing with an appropriate balance of density or color with respect to respective production colors as a result of the color correction.

A still further object of the present invention is to provide an image forming apparatus and a color correction method in which printing with a predetermined production color is performed by a printing portion of the image forming apparatus, a printed image of the predetermined production color is read by a reading portion of the same image forming apparatus, and content stored in a table which is used for printing of a color image is updated with a color component obtained based on a read result by the reading portion so as to perform color correction, so that an image printed by the printing portion based on a result read by the reading portion which has been subjected to the color correction can match an image read by the reading portion and thereby a color of an original image can be faithfully reproduced, wherein since the printing with the predetermined production color for the color correction is performed at a print duty which is previously set, printing can be performed with the printing duty lowered correspondingly even when density read by the reading portion tends to high due to influence of the printing medium, and thereby the read density can be appropriate to make the content stored in the table corresponding thereto appropriate.

In the first aspect of the present invention, there is provided a color correction method for performing color correction of a system using a table storing m-valued color component data corresponding to a production color which can be printed by a printing portion of the system which portion performs printing on a basis of n-valued output color component data (m>n), the table being used for conversion process of print data into n-valued data the method comprising the steps of:

receiving an execution command of a color correction process;

printing the predetermined production color using the output color component data corresponding to the predetermined production color, by means of the printing portion;

reading a result of printing of the predetermined production color, by means of a reading portion; and updating the color component data, which is stored in the table and corresponds to the predetermined output color, by the color component data obtained from a read result of the reading step.

In the second aspect of the present invention, there is provided an image forming apparatus having a reading portion and a printing portion, the printing portion performing printing on a basis of a result of reading by the reading portion, the apparatus comprising:

table means for storing color component data for each color component corresponded to a production color which can be printed by the printing portion, the table means is used for generating output color component data used by the printing portion on a basis of color component data obtained from a result of reading by the reading portion upon printing of a color image; and color correction control means for making the printing portion perform printing of a predetermined production color using the output color component data corresponding to the predetermined production color and making the reading portion perform reading of a result of printing of the predetermined production color, and updating storage data of the table means corresponding to the predetermined production color by the color component data obtained from a result of reading by the reading portion.

In the third aspect of the present invention, there is provided a storage medium which is connected to an information processing apparatus and a program stored in which is readable by the information processing apparatus, the printing medium storing a process, wherein the process is a color correction process of a system using a table storing m-valued color component data corresponding to a production color which can be printed by a printing portion of the system which portion performs printing on a basis of n-valued output color component data (m>n), the table being used for conversion process of print data into n-valued data, the method comprising the steps of:

receiving an execution command of a color correction process;

printing the predetermined production color using the output color component data corresponding to the predetermined production color, by means of the printing portion;

reading a result of printing of the predetermined production color, by means of a reading portion; and updating the color component data, which is stored in the table and corresponds to the predetermined output color, by the color component data obtained from a read result of the reading step.

The above and other object, effects, features and advantages of the present invention will become more apparent from the following description of embodiments thereof taken in conjunction with the accompanying drawings.

BRIEF DESCRIPTION OF THE DRAWINGS

FIGS. 3A and 3B are illustrations diagrammatically showing a production color table 1 and an output buffer employed in chart printing and copy printing in the facsimile machine;

FIGS. 6A, 6B and 6C are diagrammatic illustrations showing a read buffer, a converted read buffer, a CMY summing table, a CMY aggregation table and a production color table 2 which are used for a reading process and for a color correction process in the facsimile machine;

FIGS. 9A, 9B and 9C are diagrammatic illustrations showing a print buffer, a production color table 2 and an error buffer which are used for copy printing in the facsimile machine, respectively;

FIG. 13 is a flowchart showing a diagram of FIGS. 13A and 13B.

DESCRIPTION OF THE PREFERRED EMBODIMENT

Hereinafter, embodiments of the present invention will be disclosed in detail with reference to the drawings.
(First Embodiment)

Figure 1:
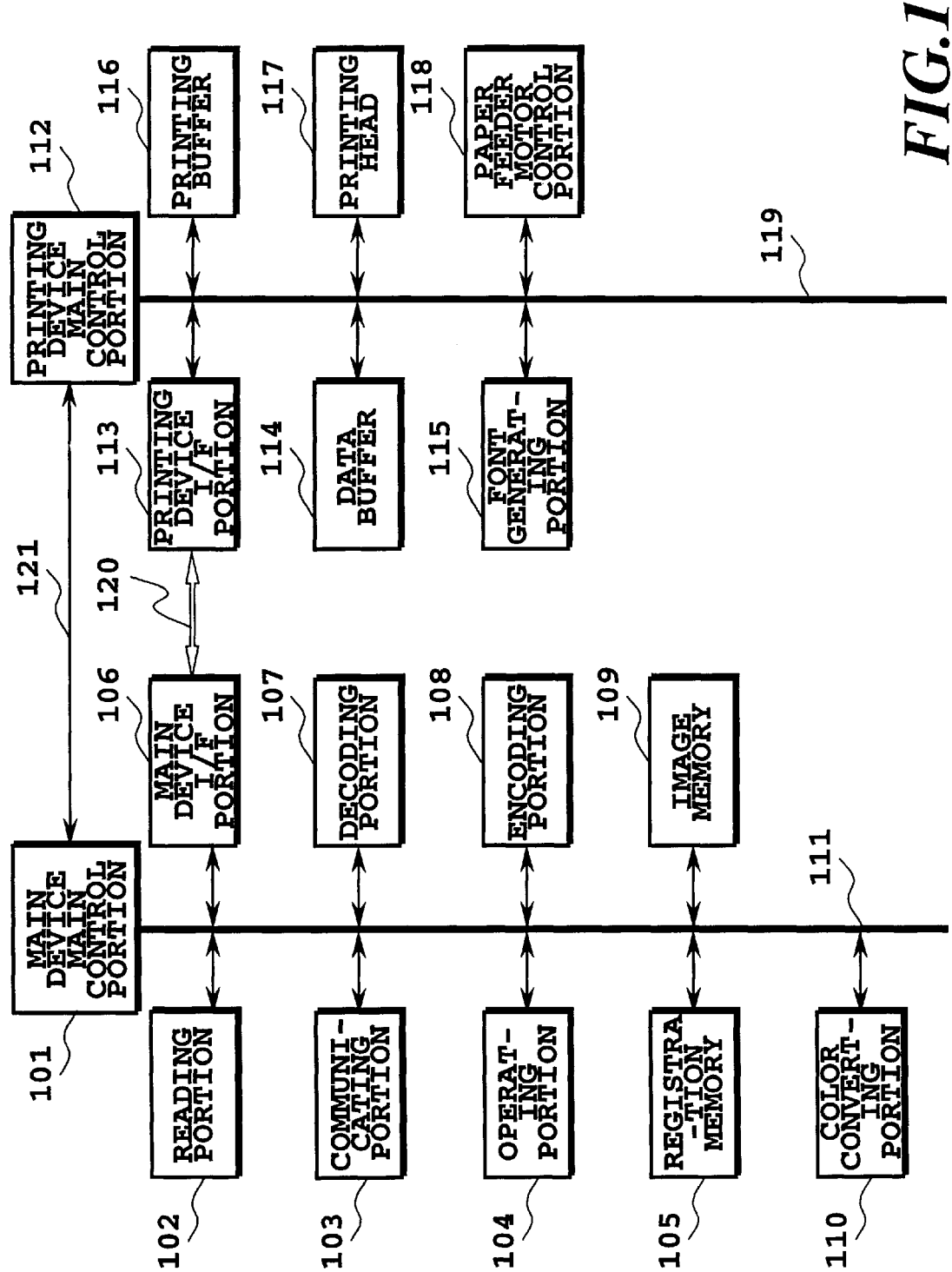
FIG. 1 is a block diagram showing a facsimile machine according to a first embodiment of the present invention.

FIG. 1 is a block diagram showing a construction of a facsimile machine according to a first embodiment of the present invention.

A construction of the facsimile machine of the shown embodiment is generally separated into two portions. One is a main device portion performing basic operation of the facsimile machine, such as communication, reading, encoding and decoding of data and so on. The other is a printing device portion receiving a printing data from the main device portion to performing printing.

In FIG. 1, a reference numeral 101 denotes a main control portion of the main device portion for controlling overall main device portion, which is constructed with MPU, ROM, RAM and so on. On the other hand, a reference numeral 112 denotes a main control portion of the printing device portion for controlling overall printing device portion, which is constructed with MPU, ROM, RAM and so on, similarly. The main control portion 101 and the main control portion 112 performs control of the facsimile machine of the shown embodiment with exchanging control signal via a serial signal line 121.

In the main device portion, a reading portion 102 optically reads an original document and separates it into R, G, B color component signals. Each color component signal of R, G, B is output as a multi-value data of eight bits per one pixel. More specifically, the reading portion 102 includes a color contact sensor as a reading device, and the original document is automatically fed to the sensor by means of an ADF mechanism to read the original document and output the RGB multi-value data, sequentially.

The RGB multi-value data output from the reading portion 102 is temporarily stored in an image memory 109. It should be noted that the image memory 109 also stores a received data. The R, G, B data stored in the image memory 109 are converted into binary data of Y, M, C and K respectively by a color converting portion 110 using a production color table, as will be explained later. More specifically, respective 8 bits of R, G, B data for one pixel are converted into the 8 bit multi-value data of respective Y, M, C by a logarithm (log) conversion. Thereafter, by using the production color table, a combination of binary data of C, M, Y, K or C, M, Y respectively which has the smallest distance to the Y, M, C multi-value data in a color space is obtained and this obtained data is outputted as the binary data. It should be noted that, in the color converting portion, a process is also performed diffusion of an error to be caused upon binarization to pixels located around the pixel subject to the color conversion.

Figure 11:
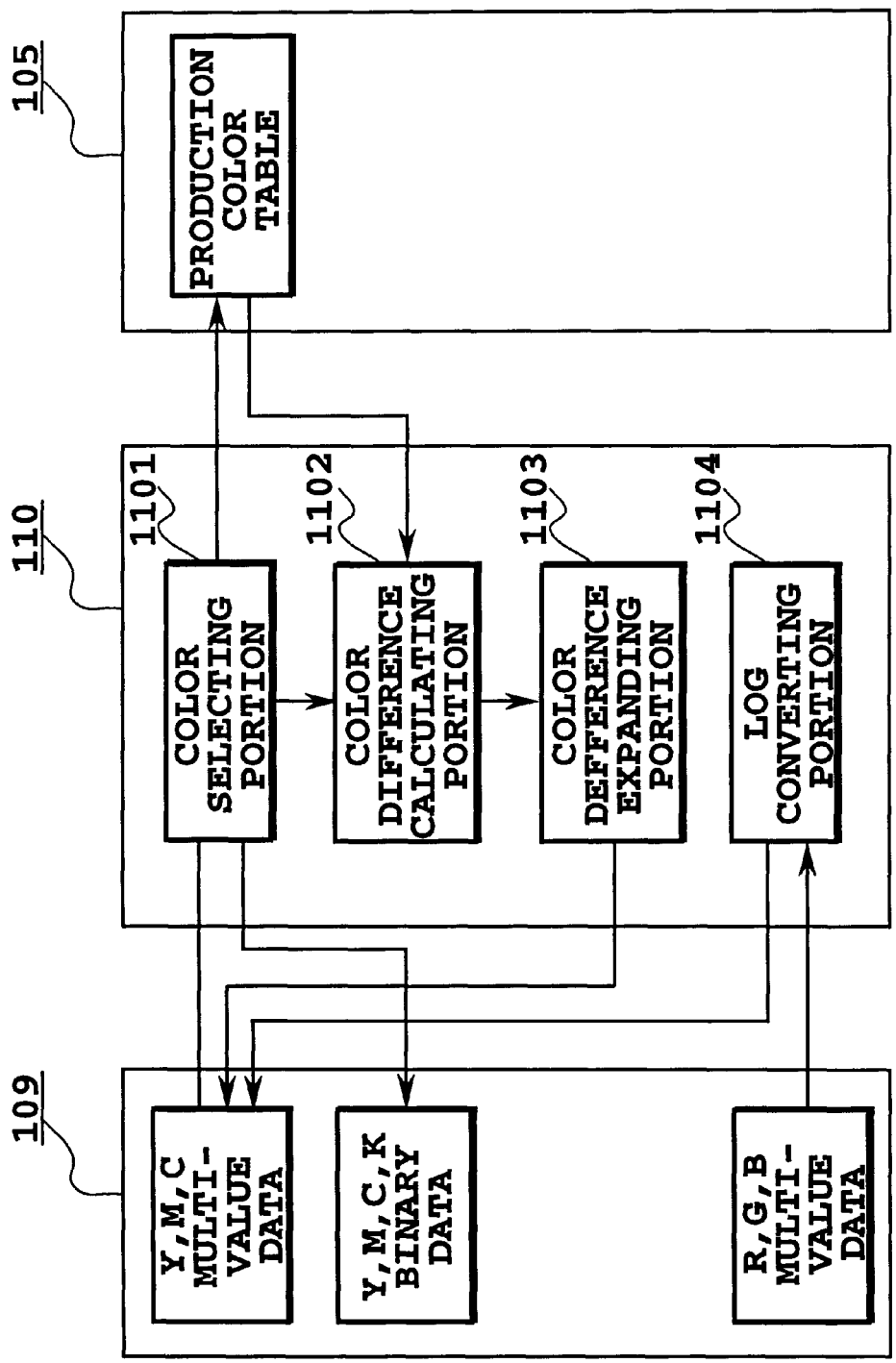
FIG. 11 is a block diagram showing a detailed construction of a color converting portion in one embodiment of the present invention.

FIG. 11 is a block diagram showing a detailed construction of the foregoing color converting portion 110. In the shown embodiment of the color converting portion 110, a binarization process and an error diffusion process are performed by a construction as disclosed in Japanese Patent Application Laid-open No. 8-331397 (1996), for example. In FIG. 11, a color point selecting portion 1101 obtains colors to be output by sequentially, for each pixel, reading the YMC multi-value data as an input image, and selects Y, M, C, K data of the binary values which is the closest to the foregoing obtained color from the production color table, as set forth later. Further, a color difference calculating portion 1102 derives a distance between a color expressed by the selected binary data selected in the input image set forth above and a color obtained in the foregoing input image in an input color space by the color point selecting portion 1101, namely derives a color difference. A color difference diffusing portion 1103 adds the color difference to the pixels located in the vicinity of the input pixel.

Again referring to FIG. 1, the operating portion 104 has an operation key, a display device or the like for performing various operation by a user in the shown embodiment of the facsimile machine. Further, a registration memory 105 stores a telephone number data, such as one-touch dial or the like, or communication result information, and also stores the production color table used in binarization process. A communication portion 103 performs connection of reading, cutting off or modulation of a transmission data or demodulation of a reception data, and exchanging of data with a remote station via a communication line. Furthermore, concerning transmission and reception of data, a decoding portion 107 performs decoding of the encoded image data. On the other hand, an encoding portion 108 performs encoding of the image data.

A main device I/F portion 106 performs connection control with the printing device portion by means of a wide use interface of Centronics specification. More specifically, the wide used interface is controlled so that the 4 bit signals of CMYK obtained by the foregoing binarization process are converted into a color format data to transmit the color format data to the printing device portion side by the general purpose interface, or, when monochrome binary data is input, the monochrome binary data is converted into a monochrome format data to transmit it to the printing device. Further, the main device I/F portion 106 also has a function for detecting a condition of the printing device portion via an interface, and notifying a result of the detection to the main control portion 101.

On the other hand, in the printing device portion, a printing head 117 ejects an ink to perform printing and more specifically, has an electro-thermal transducer corresponding to respective ink ejection openings to eject the ink by utilizing a thermal energy generated by the electro-thermal transducer.

A data buffer 114 temporarily stores a binary print data received from the main device portion via the printing device I/F portion 113. On the other hand, the print buffer 116 develops dot data obtained after performing a predetermined process, such as generation of a font data or the like by a font generating portion 115 and so on for the printing data stored in the data buffer 114 and stores the developed dot data for one line to be printed by one read of the printing head 117 as a raster data.

A paper feeding and discharging motor control portion 118 controls driving of a transporting motor for transporting a printing paper.

Figure 2:
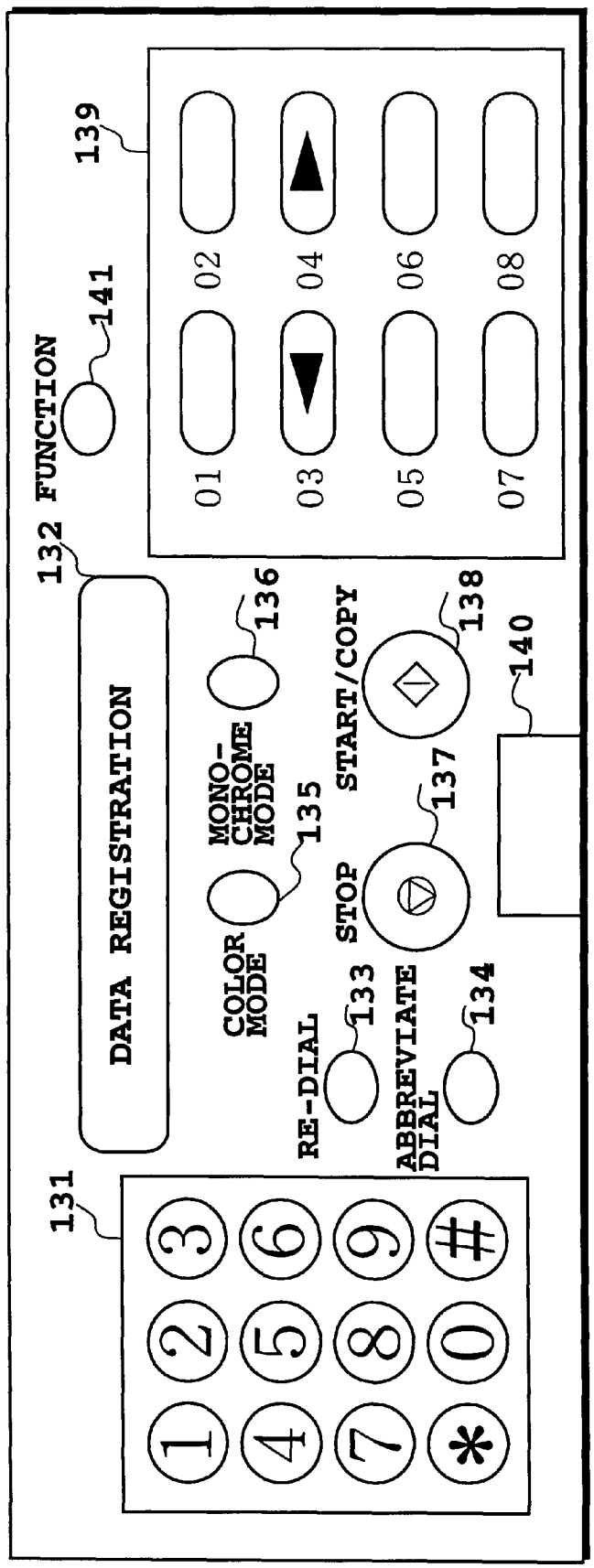
FIG. 2 is an illustration showing an operating portion in the facsimile machine.

FIG. 2 is an illustration showing an operation panel in the operating portion 104 shown in FIG. 1.

In the drawing, a reference numeral 131 denotes a ten-key used upon inputting a telephone number and can be used for other operation. A reference numeral 132 denotes an LCD for displaying a condition of the facsimile machine of the embodiment, alarm, kind of error, a registered data and so on.

A reference numeral 133 denotes a redialing key which permits re-entry of the telephone number last input by the ten-key, a reference numeral 134 denotes an abbreviated dialing key used for abbreviated dialing for calling out to the telephone number registered corresponding to the abbreviated dialing number. A reference numeral 135 denotes a key for switching a color mode among three kinds of modes of fine, standard and photo, a reference numeral 136 denotes a key for switching a monochrome mode among three kinds of modes of fine, standard and photo, a reference numeral 137 denotes a key used for stopping receiving, transmission, operation for copying or the like, or registering, and a reference numeral 138 denotes a key used for transmission, initiation of copying, setting of the registration data and the like.

A reference numeral 139 denotes a one-touch key for calling out the telephone number registered corresponding to the key number and can also be used as a cursor key upon registering, reservation of transmission or copy operation. A reference numeral 140 denotes a LCD blinking upon alarming or an occurrence of an error, and a reference numeral 141 denotes a key used for entry into registration, report output, test mode or the like.

Printing of a color correction chart and automatic color correction on a basis of the printed color correction chart in the facsimile machine of the construction set forth above, will be explained hereinafter.

FIG. 3A is a diagrammatic illustration showing a production color table 1 (clr_tbl (tbl_cnt, clr_cnt)) stored in the registration memory 105. Further, FIG. 3B is a diagrammatic illustration showing an output buffer (clr_buf (clr_cnt, p)) stored in the image memory 109. These table and buffer are used for printing process of a color correction chart shown in FIG. 5.

The production color table 1 shown in FIG. 3A represents relationship between production colors of white, yellow, magenta, red, cyan, green, blue and black to be printed as colors of he color chart, and output color components of cyan, magenta, yellow and black corresponding to ink colors of printing heads realizing the production colors. Each lateral line of the shown production color table 1 is identified by a number tbl_cnt assigned corresponding to respective the production color. On the other hand, each longitudinal line of the production color table 1 is identified by a number clr_cnt as a serial number of respective of the output color components.

When printing any of the production color tbl-cnt by using the production color table 1, the output color component is not output in the case that a content of the table corresponding to respective output color component clr_cnt is "0", and the output color component is output in the case that the content of the table corresponding to the output color component clr_cnt is "1". For example, when printing is performed with the production color 5 (green), the contents of the output color components of 0 (cyan) and 2 (yellow) become "1", respectively. Therefore, the output color components 0 (cyan) and 2 (yellow) are output. On the other hand, since the contents of the output color components of 1 (magenta) and 3 (black) are "0", these output color components are not output.

It should be noted that, concerning the production color table, clr_tbl (tbl_cnt, clr_cnt) represents content ("0" or "1") stored in a position identified by the production color tbl_cnt and the output color component clr_cnt in the production color table 1.

The output buffer shown in FIG. 3B is a buffer for determining a print position of each output color component obtained by the foregoing output color table 1. Each lateral line of the output buffer is identified by clr_cnt as the serial number of the output color components (four colors of cyan, magenta, yellow and black) to be output, and each longitudinal line of the output buffer is identified by p corresponding to the position to be actually printed by the print portion. The output buffer is initialized so that all the content thereof are rewritten to "0" in the initialization process of the shown machine. Then, by rewriting the content of a position identified by a combination of the output color component clr_cnt and the position p to one of value (1~255) of 1 byte data, the output color component clr_cnt is output to print the color of the component on pixels which correspond to pixels of bit data of "1" among 8 pixels of the position p. More specifically, the storage data in the output buffer is data for one unit of 8 pixels for handling byte data. Therefore when one bit is "0", the corresponding to the bit pixel is not printed and when the one bit is "1", the pixel corresponding to the bit is printed. As an example of the output buffer, a buffer length of each output color component is set to 360 by dividing a number of pixels of 2880 as converted into 8 inches for A4, 360 dpi, by 8.

It should be noted that, concerning the output buffer, clr-buf (clr_cnt, p) represents the contents of the output buffer identified by the output color component clr_cnt and the position p.

Figure 4:
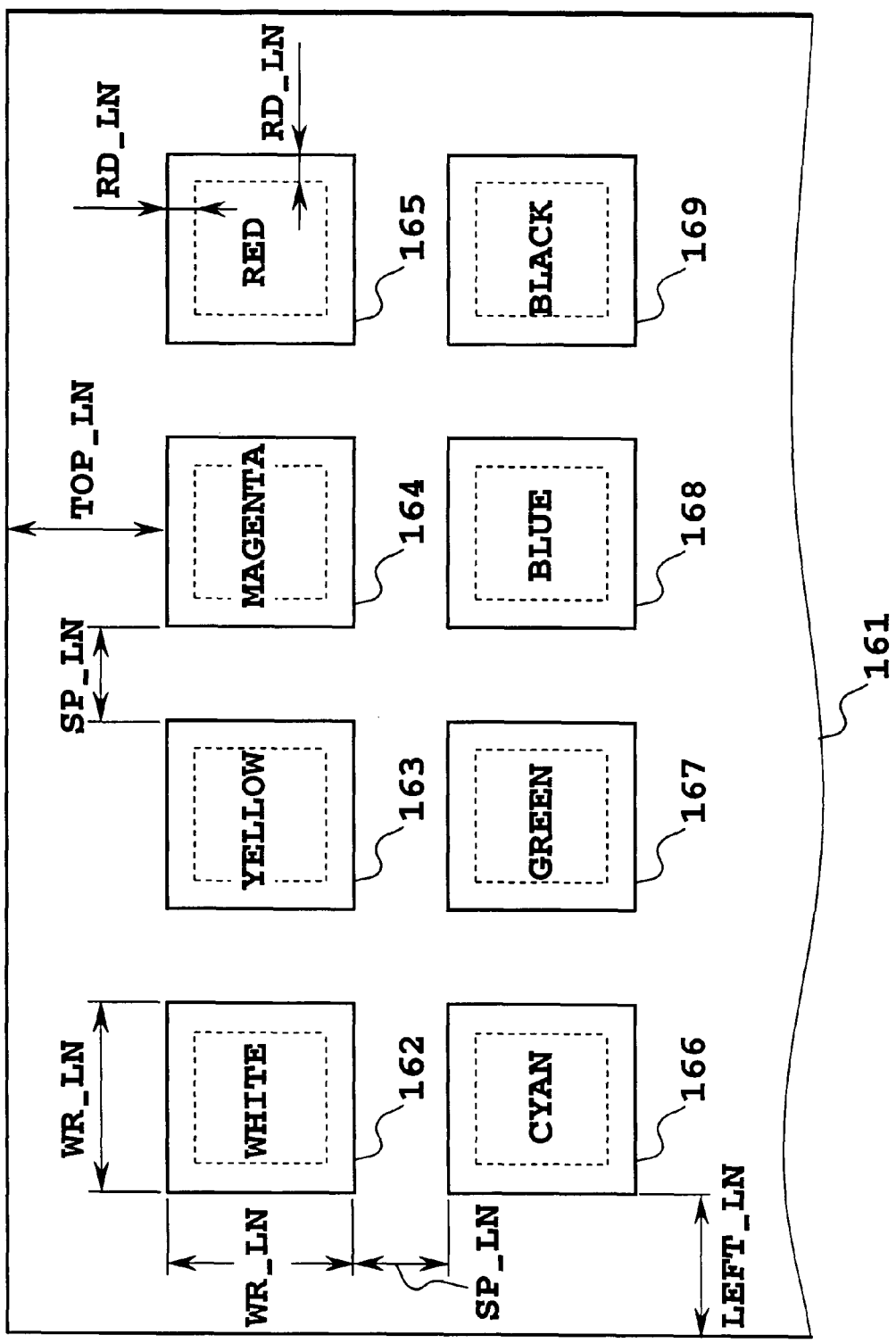
FIG. 4 is a diagrammatic illustration showing a color correction chart printed by the facsimile machine.

FIG. 4 is an illustration showing a color correction chart printed in the shown embodiment.

In FIG. 4, a reference numeral 161 denotes a printing paper on which the color correction chart is printed. A reference numerals 162 to 169 show patches respectively printed with 8 kinds of output colors for the color correction. In each patch, reading is performed within a range shown by broken line. More specifically, a reading range is set inside of the printed patch so as to avoid an influence of a paper feeding error caused due to accuracy of feeding of the printing paper by a transporting mechanism, and of density variation due to bleeding between the patch and a blank portion of the printing paper, upon reading of the patch. A reference numeral 162 denotes the patch of white, a reference numeral 163 denotes a patch of yellow, a reference numeral 164 denotes the patch of magenta, a reference numeral 165 denotes the patch of red, a reference numeral 166 denotes the patch of cyan, a reference numeral 167 denotes the patch of cyan, a reference numeral 168 denotes the patch of blue, and a reference numeral 169 denotes the patch of black. These patches are production in sequential order of arrangement of the production colors tbl_cnt in the production color table shown in FIG. 3A. Each patch is printed in square shape, in which a number of pixels in longitudinal and lateral directions is expressed by WR_LN.

Also, a number of white pixels between respective patches is expressed by SP_LN. Upon reading the chart by the reading portion 102, the patch is required to have a certain size. Therefore, in the shown embodiment, eight patches are arranged in two rows.

A distance to patches in the first row from a tip end of the printing paper is expressed by TOP_LN, and a distance to the left end patch from the left end of the printing paper is expressed by LEFT_LN. Furthermore, in each patch, a distance between the reading range and an outermost contour of the patch is expressed by RD_LN.

In the embodiment shown in FIG. 4, while the 8 kinds of patches is printed, for example, it is also possible to perform binarizing process including output color components of light color ink to prepare the color correction chart of more than the 8 kinds of production colors for the color correction, when the printer which can output the light color inks are employed.

Figure 5:
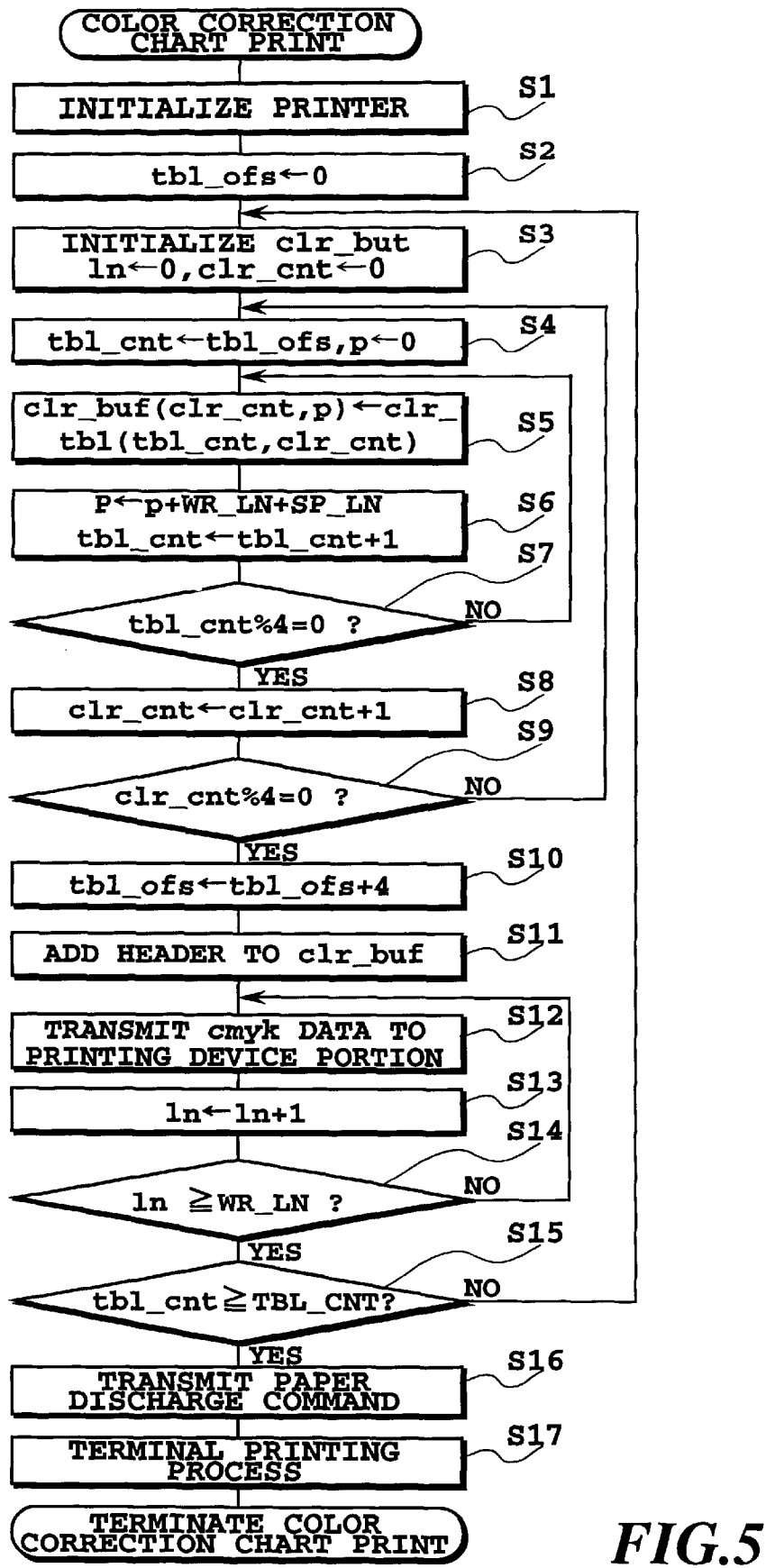
FIG. 5 is a flowchart showing a color correction chart printing process in the first embodiment of the present invention.

FIG. 5 is a flowchart showing the color correction chart printing process according to the first embodiment of the present invention.

The print mode of the color correction chart can be triggered by depressing the function key 141 and the predetermined ten-key shown in FIG. 2. Once the color correction chart print mode is triggered, at step 1, the main control portion 101 transmits a trigger command to the printing device main control portion 112 via the serial signal line 121. In response to this, the printing device main control portion starts up and initialize the printer. After completion of the initialization, an initial setting command for color data output is transmitted from the main device I/F portion 106 to a printing device I/F portion 113 via the Centronics line 120. The printing device main control portion 112 makes judgment of the initial setting command to perform initial setting for color data output. In this setting, initial setting of the top margin TOP_LN of the printing paper and the left end margin LEFT_LN of the printing paper are included.

Next, at step S2, a parameter tbl_ofs for designating the production color tbl_cnt as an address in the production color table 1 is set at an initial value 0. At step S3, the contents clr_buf of the output buffer shown in FIG. 3B are all set to be 0. Also, a register in storing a number of printing lines is set to 0, and, the output color component clr_cnt as an address in the production color table 1 and the output color buffer is set to be initial value 0. The shown embodiment performs process of setting chart print data for each output color component. Therefore, by performing this setting of the output color component clr_cnt, at first, for cyan, reading out of the production color table 1 and storing of the read out data into the output buffer are performed. Next, at step S4, the content of the production color tbl_cnt is set with a value of the production color designation parameter tbl_ofs. Namely, it is understood that since the content is set to 0 at first, outputting from the production color table 1 is performed with respect to white, and then, storing of the output data to the output buffer is performed. In addition, the position p in the output buffer is set at the initial value 0.

Next, at step S5, the data clr_tbl (tbl_cnt, clr_cnt) obtained with taking the production color tbl_cnt and the output color component clr_cnt as addresses in the production color table 1 is read out. The read out data is then set at respective positions in a range of number of pixels WR_LN shown in FIG. 4, one end portion of which is a position (clr_cnt, p) identified by taking the output color component clr_cnt and the buffer position p as addresses in the output buffer. By this process, the output component data of cyan for one line of the patch 162 of white has been set. It should be noted that, in this example, the production color is printed as so-called solid image. However, it is also possible to print the patch with lower print duty, such as a checkered pattern or the like, for example. At step S6, by adding the number of pixels WR_LN and the number of white pixels SP_LN to the buffer position p, the buffer position p for setting output data of the production color is updated. In conjunction therewith, by adding 1 to the production color tbl_cnt, respective addresses in the production color table and the output buffer become that for the next production color.

At step S7, judgment is made whether the production color tbl_cnt is divisible by 4. If not divisible, the process returns to step S5 to repeat the subsequent process until the production color tbl_cnt becomes divisible by 4. Namely, by this judgment step, with respect to the output color component of cyan, output data for one line of respective patches of white, yellow, magenta and red are set in the output buffer. On the other hand, when the production color tbl_cnt is divisible by 4, the process is advanced to step S8 to add 1 to the output color component clr_cnt for setting the output data for the next output color component. At step S9, judgment is made whether the output color component clr_cnt is divisible by 4 or not. If not divisible, the process is returned to step S4 to repeat the subsequent step until the output color component clr_cnt becomes divisible by 4. Namely, by this judgment step, for all of the output color components of cyan, magenta, yellow and black, setting of the output data for one line of respective patches of white, yellow, magenta, red is completed. On the other hand, when the output color component clr_cnt is divisible by 4, the process is advanced to step S10 to add 4 to the production color designation parameter tbl_ofs for setting output data of the production colors of cyan, green, blue and black for the next row.

At step S11, a color data output command derived by adding a header indicative of data amount to the data of the content clr_buf of each output color component in the output buffer, which content is set through the process up to the step S9, is generated. At step S12, each color data output command thus generated is transmitted from the main control portion 101 to the printing device main control portion 112. Each color data output command thus transmitted is judged by the printing device main control portion 112 and print of one line of the production color is performed by the printing head 117. At step S13, a printed line number ln counting a number of printed lines is incremented by 1. Then, at step S14, judgment is made whether the printed line number ln is greater than or equal to the number of pixels WR_LN or not. In this judgment, when the printed line number in is less than the number of the pixels WR_LN, the process is returned to step S12 to repeat the process of printing the output data for one line set through the process up to the step S9 until it becomes greater than or equal to the number of pixels WR_LN. At step S14, when the printed line number in becomes greater than or equal to the number of pixels WR_LN, the process is advanced to step S15.

At step S15, judgment is made whether the production color tbl_cnt becomes greater than or equal to a all output color number TBL_CNT. If the output color tbl_cnt is less than the all output color number TBL_CNT, the process is returned to step S3 to repeat the subsequent process. By this process, setting of the output data of the production colors of cyan, green, blue and black of the second row of the chart set at step S10 and printing of the patch based on the setting are performed.

If judgment is made that the production color tbl_cnt is greater than or equal to the all output color number TBL_CNT, the process is advanced to step S16 to transmit a paper discharge command from the main control portion 101 to the printing device main control portion 112. The paper discharge command is judged by the printing device main control portion 112 and the printing paper is discharged. Finally, at step S17, in order to terminate printing, a termination command is transmitted from the main control portion 101 to the printing device main control portion 112 via the serial signal line 121. In response to the termination this command, the printing device main control portion 112 terminates printing to terminate printing process of a sequence of color correction chart.

It should be noted that the image memory 109 has storage regions for storing each of the output color designation parameter tbl_ofs, the printing line number ln, the output color component clr_cnt, the production color tbl_cnt, and the buffer position p. Further, the number of pixels WR_LN, the number of white pixels SP_LN between the respective patches of the production colors and the all output color number TBL_CNT are stored in ROM in the main control portion 101.

Next, the color correction on a basis of the chart printed as set forth above will be explained with reference to FIGS. 6A to 6C, 7 and 8.

FIGS. 6A to 6C, 7 and 8 are illustrations showing a buffer and so on to be employed in the shown embodiment of the color correction process. FIG. 6A shows a read buffer (rgb_buf (rgb_cnt, r)), FIG. 6B shows a converted read buffer (cmy_buf (cmy_cnt, q)), FIG. 6C shows a CMY addition table (cmy_stbl (tbl_cnt, cmy_cnt)), a CMY aggregation table (cmy_tbl (tbl_cnt, cmy_cnt)) or a production color table 2 (CMY_TBL (tbl_cnt, cmy_cnt)), respectively.

The read buffer shown in FIG. 6A is a buffer storing 24 bit data in combination of R, G, B for read one line by the read portion 102. Each row in the read buffer is identified by rgb_cnt as a serial number corresponding to respective colors of red, green and blue of RGB 24 bit data. On the other hand, each column is identified by a buffer position r corresponding to a read position. A storage data of the buffer identified by the set of rgb_cnt and r is consisted of one byte of 0 to 255. Namely, tone data of 256 tones of respective of R, G, B are stored.

The converted read buffer shown in FIG. 6B is a buffer storing 24 bit data of C, M, Y in combination which are logarithmically converted from 24 bit data of R, G, B for one line. Each row of the converted read buffer is identified by cmy_cnt which is a serial number of each color of C, M, Y, and each column is identified by the buffer position q corresponding to the read position. A storage data of the buffer is consisted of one byte of 0 to 255 similarly to the read buffer. It should be noted that, in the shown embodiment, as examples of the read buffer and the converted read buffer, the buffer length of each color component is set the number of pixels to 2880 as converted into 8 inch of A4, 360 dpi.

The CMY addition table shown in FIG. 6c is a table storing sum of all storage data for each color component cmy_cnt which are obtained in the range of the broken line of the respective patches with respect to the 8 kinds of respective production colors tbl_cnt shown in FIG. 4, in the foregoing converted read buffer. For example, when the production color tbl_cnt is 5 (green) and the color component cmy_cnt is 1 (magenta), a result of summing of magenta component in the range specified by the read position corresponding to inside of the broken line of the patch 167 is stored.

It should be noted that cmy_stbl (tbl_cnt, cmy_cnt) represents a storage content identified by a combination of the production color tbl_cnt and the color component cmy_cnt in the CMY addition table.

Similarly, the CMY aggregation table shown in FIG. 6C has the same construction to the foregoing CMY addition table. The CMY aggregation table is the table storing data (0 to 225) obtained by dividing data in the CMY addition table by number of pixels within the range of the broken line of the corresponding patch.

Also, the production color table 2 shown in FIG. 6C has the same construction as the CMY aggregation table and holds data updated by the content of the CMY aggregation table in the color correction process as will be explained later, so that the production color table 2 can be used as a CMY binarization table in the color converting portion 110 at printing operation.

It should be noted that the foregoing buffer and table are stored in the image memory 109 except for the production color table 2. On the other hand, the production color table 2 is stored in the register memory 105.

Figure 7:
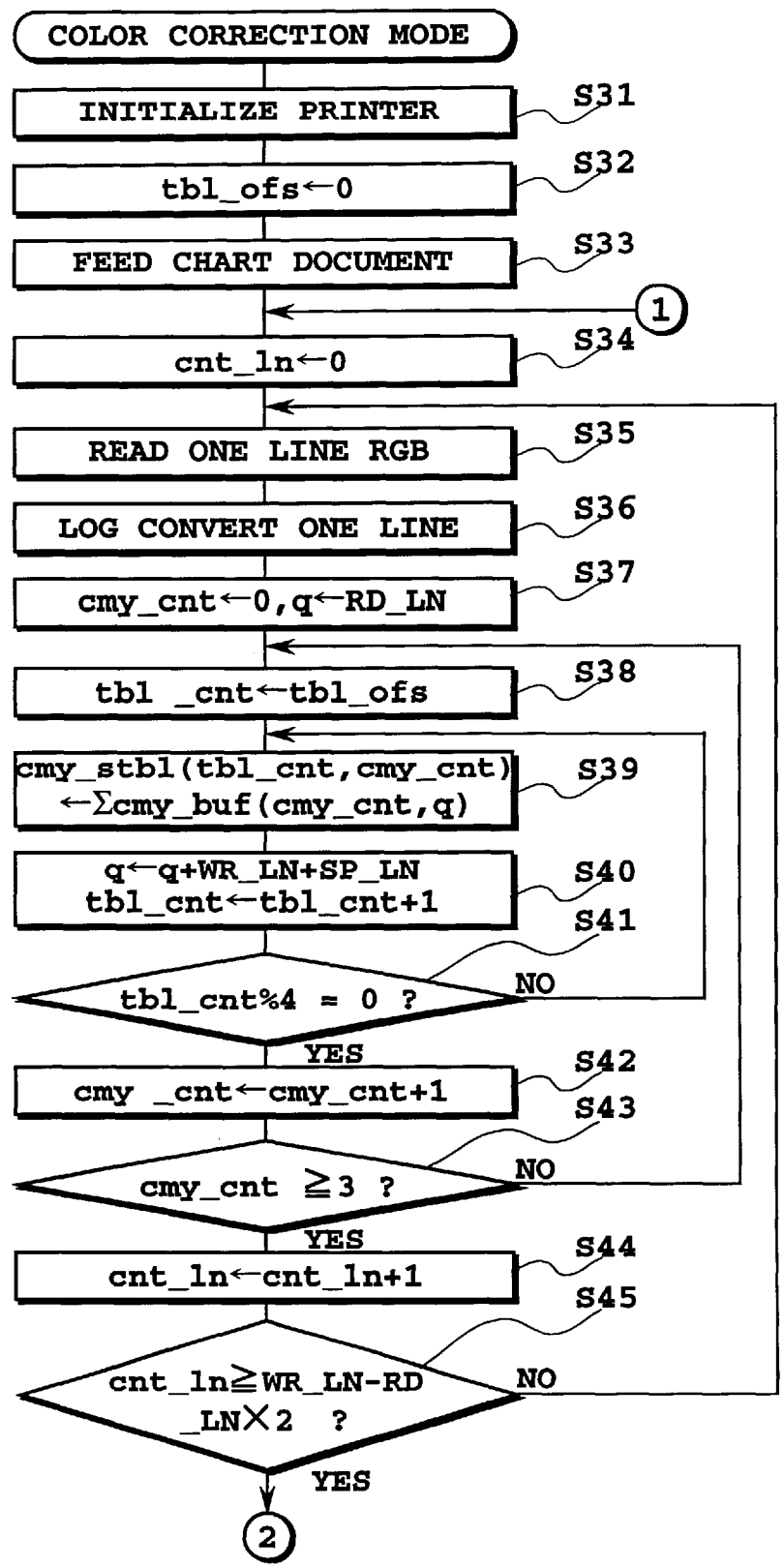
FIG. 7 is a flowchart showing a process of a color correction mode in the facsimile machine.
Figure 8:
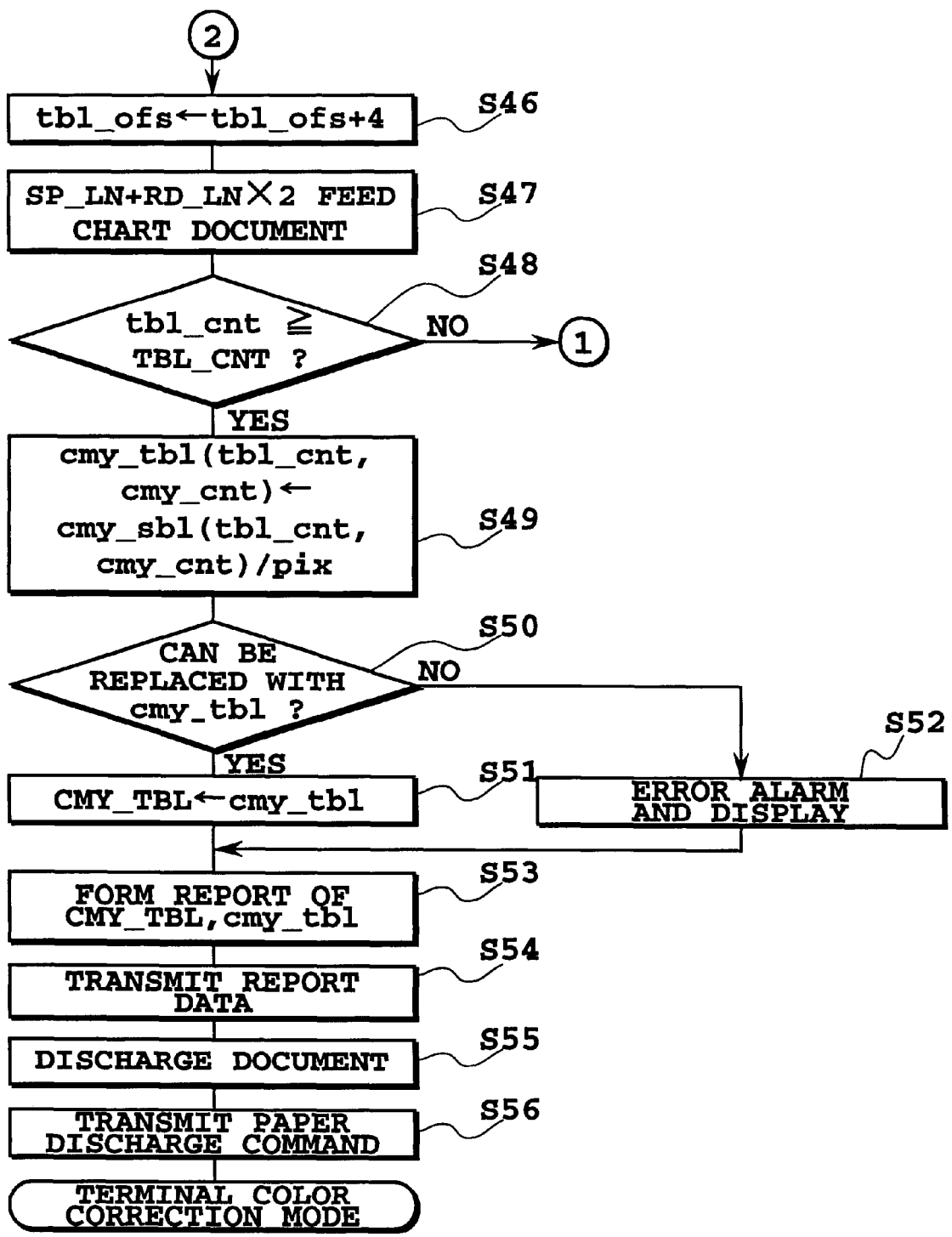
FIG. 8 is a flowchart showing a process of color correction mode in the facsimile machine.

FIGS. 7 and 8 are flowcharts showing process of the color correction mode in the shown facsimile machine.

The process relating to the color correction mode is triggered by depressing the function key 141 (FIG. 2) and the predetermined ten-key 131 after setting the chart for the color correction (FIG. 4) output through the process shown in FIG. 5 on an ADF table of the reading portion 102.

When the color correction mode is triggered, at first at step S31, the main control portion 101 transmits the a trigger command to the printing device main control portion 112 via the serial signal line 121. In response to the trigger command, the printing device main control portion 112 starts up the printing device portion to perform initialization. After completion of the initialization, an initial setting command for outputting a report is transmitted from the main device I/F portion 106 to a printing device I/F portion 113 via a Centronics line 120 to perform initial setting for report by making judgment of the initial setting command.

Next, at step S32, tbl_ofs as the production color designation parameter is initialized to 0, and at step S33, the color correction chart set on the ADF table is transported for (TOP_LN+RD_LN) (see FIG. 4) to perform verging-up for reading. Furthermore, at step S34, a reading line number cnt_ln is set at the initial value 0.

Next, at step S35, the R, G, B data for one line is read by the reading portion 102, and is stored in the corresponding position r of the read buffer (rgb_buf (rgb_cnt, r)) shown in FIG. 6A, for each components of R, G, B. By this process, for one line of white, yellow, magenta and red shown in FIG. 4, reading is performed. After completion of reading for one line, feeding of the chart for one line is performed. Next, at step S36, data of the read buffer storing the result of reading is converted by the logarithmic conversion to store a result thereof in the converted read buffer (cmy_buf (cmy_cnt, q)) shown in FIG., 6B. In other words, for each color component of C, M, Y, data, c, m, y after conversion are stored at position q corresponding to respective read positions.

The foregoing logarithmic conversion is derived on a basis of the following calculation formulae:

$$C=-\log\{(R+1)/256\}\times 255/1.4+0.5$$
$$M=-\log\{(G+1)/256\}\times 255/1.4+0.5$$
$$Y=-\log\{(B+1)/256\}\times 255/1.4+0.5$$

At step S37, in order to set data to the CMY addition table shown in FIG. 6C, respective color components cmy_cnt are set to be 0, and the buffer position q is set at RD_LN as an initial value. Similarly, at step S38, the output color tbl_cnt is set by the initial value tbl_ofs set at step S32. Then, at step S39, data for pixels (WR_LN–RD_LN×2) (see FIG. 4) of the patch position designated by the position q with respect to each color component cmy_cnt of the converted read buffer cmy_buf, are read, and then, the sum of the read data is stored at the position identified by the combination of the production color tbl_cnt and the color component cmy_cnt in the CMY addition table cmy_stbl. By this process, a total of the read data for one line of the while patch is stored, at first.

Next, at step S40, in order to store the read data of the patch of the next color, the buffer position q is updated by adding the number of pixels WR_LN and the number of white pixels SP_LN to the buffer position q. In addition, the production color tbl_cnt as the address for storing the production color is incremented by 1. Then, at step S41, judgment is made whether the production color tbl_cnt is divisible by 4. If not divisible, the process returns to step S39 to repeat the subsequent process. By this judgment step, with respect to one color component, storing the data for one line of respective patches of white, yellow, magenta and red in the CMY addition table is completed.

On the other hand, when the production color tbl_cnt is divisible, the process is advanced to step S42 to add 1 to the color component cmy_cnt in order to store data for next color component. At step S43, judgment is made whether the color component cmy_cnt is greater than or equal to 3 for judging whether, for all of the color components cmy_cnt, the data are stored in the CMY addition table. If the cmy_cnt is less than 3, the process is returned to step S38 to repeat the subsequent process.

If cmy_cnt is greater than or equal to 3, the process is advanced to step S44 to increase the read line number cnt_ln by 1, and at step S45, judgment is made whether the read line number cnt_ln is greater than or equal to a predetermined read line number as (WR_LN–RD_LN×2). If the predetermined line number is not reached, the process is returned to step S35 to perform the similar process for each patch of the same row in the chart.

When the predetermined line number is reached, the process is advanced to step S46 shown in FIG. 8. In order to perform a similar process with respect to each patches in the next row in the chart, 4 is added to the production color designation parameter tbl_ofs. In addition, at step S47, in order to perform reading of the row, the chart is fed for (SP_LN+RD_LN>2).

Next, at step S48, judgment is made whether the production color tbl_cnt becomes greater than or equal to the all output color number TBL_CNT. When the output color tbl_cnt is less than the all output color number TBL_CNT, the process is returned to the step S34 to repeat similar process until the output color tbl_cnt becomes greater than or equal to the all output color number TBL_CNT. By this process, concerning all of eight kinds of the production colors, the CMY addition table is completed.

When storing the date to the CMY addition table is completed for all production color number, the process is advanced to step S49. Then, the content of the CMY addition table cmy_stbl is divided by added pixel number pix (=(WR_LN–RD_LN×2)$^2$), for each combination of the color component and the production color and then, a result of the division is stored in the CMY aggregation table cmy_tbl for each combination similarly.

Next, at step S50, the content of the production color table 2 CMY_TBL stored in the registration memory 105 and the content of the CMY aggregation table cmy_tbl obtained as set forth above are compared to each other. When a difference of respective data is greater than or equal to a certain extent (for example, greater than or equal to 20), it is considered to be defect of the reading portion 102, then, at step S52, an error alarm or an error display is performed to notice the fact that re-evaluation of the reading portion 102 is necessary. Then, process is advanced to step S53.

On the other hand, when the difference of respective data is within a normal range, the content of the production color table 2 (CMY_TBL) is updated by the content of the CMY aggregation table cmy_tbl at step S51. By this updating process, the total color correction of the copy system of the shown facsimile machine has been performed. More specifically, as will be explained later, the production color table 2 is used for the binarization process in the subsequent copy process in which the binarization process is performed by using correspondence between the production color and the color component in the production color table 2. As a result, a result of reading by the reading portion 102 and a result of reading of an output of the printing device portion based on the former result are basically consistent with each other.

After the above-described process, at step S53, the contents of respective of the CMY aggregation table cmy_tbl and the production color table 2 CMY_TBL are formed in a form of report. At step S54, data in the report form is transmitted from the main control portion 101 to the printing device main control portion 112 as a command. The report data command is judged by the printing device main control portion 112 to print to the printing paper. Further, at step S55, the chart on the document table in the reading portion 102 is discharged. At step S56, a paper discharge command is transmitted from the main control portion 101 to the printing device main control portion 112 to discharge the report paper. Then, in order to terminate printing, the termination command is transmitted from the main control portion 101 to the printing device main control portion 112 via the serial signal line 121 to terminal sequence of color correction process.

It should be noted that the production color designation parameter tbl_ofs, the read line number cnt_ln, the color component cmy_cnt, the production color tbl_cnt, and the buffer positions q and r, storage positions of which are not clearly stated in the foregoing disclosure, are stored in the image memory 109. On the other hand, the pixel number WR_LN, the white pixel number between the respective patches of the respective production colors SP_LN, the distance RD_LN between the reading range and the production color frame and the all output color number TBL_CNT are stored in ROM of the main control portion 101.

Next, explanation will be given for the color copy output process in the shown machine which has been done the color correction.

FIGS. 9A to 9C show buffer or so forth employed in the color copy output of the shown machine. FIG. 9A is a diagrammatic illustration of a printing buffer (wr_buf (clr_cnt, p)), FIG. 9B is a diagrammatic illustration of the production color table 2 (CMY_TBL (tbl_cnt, cmy_cnt)), and FIG. 9C is a diagrammatic illustration of an error buffer (err_buf (clr_cnt, p)).

The printing buffer shown in FIG. 9A which is formed in the image memory 109 stores respective binary data of c, m, y, k. Each row of the printing buffer is identified by clr_cnt as the serial number of respective one bit data of C, M, Y, K. On the other hand, each column is identified by the buffer position p corresponding to the position where data is output to be printed. Respective data in the buffer is stored in a unit of 8 pixels in order to be handled per byte. When one bit is "0", the printing of the corresponding pixel is not performed, and when one bit is "1", printing of the pixel is performed. As an example of the printing buffer, the buffer length of each color component is set to 360 by dividing the pixel number 2880 by 8 as converted into 8 inch, of A4 and 360 dpi.

The production color table 2 shown in FIG. 9B is stored in the registration memory 105 and is obtained by color correction process. The content of the table, for example, has a value of (c, m, y)=(200, 50, 100) with respect to each color component in the case where the production color tbl_cnt is 5 (green).

Furthermore, the error buffer shown in FIG. 9C stores an error between the production color selected in the production color table 2 upon the binarization process and respective data of C, M, Y actually input as a result of reading. The error buffer is stored in the image memory 109.

Each row of the error buffer is identified by clr_cnt as the serial number of respective data of the output color component of C, M, Y, k. On the other hand, each column is identified by the buffer position p corresponding to the position of the data actually read.

The error buffer is all set to initial value 0 in the content before use. As will be explained later, the error caused relating to the position p by binarization process is diffused with appropriate weighting with respect to immediately below and left and right pixels and the diffused error is stored in the error buffer together with the error. Weighting is performed by providing weight of ½ for the pixel located immediately below and ¼ for the pixels located on left and right sides, for example. When the error is to be diffused to laterally aligned pixels, the error buffer for 3 bytes may be newly provided depending upon a number of the color components. The error buffer is illustrated to have buffer length of each output color components as the pixel number 2880, as output converted into 8 inch, A4, 360 dpi.

Figure 10:
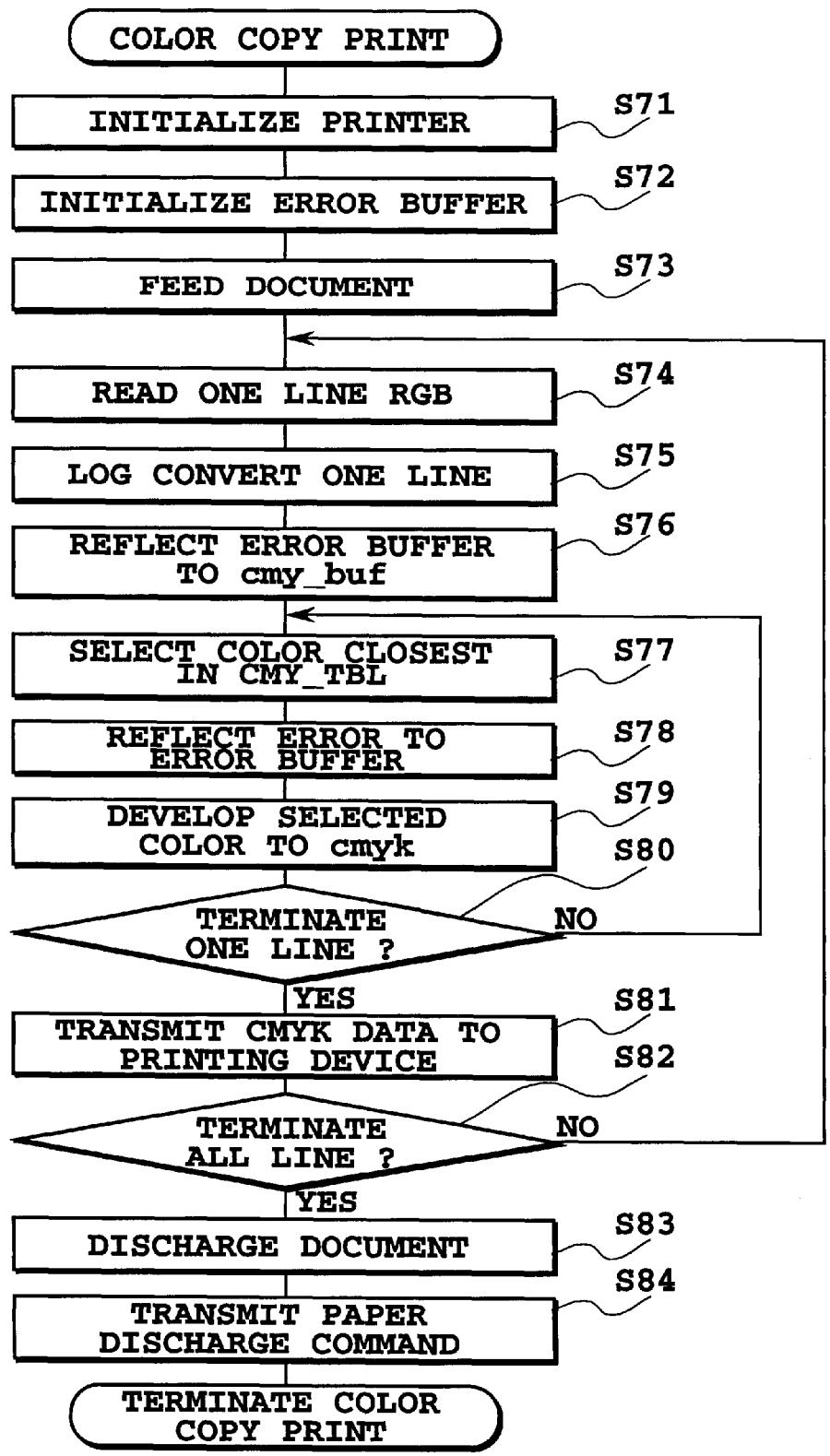
FIG. 10 is a flowchart showing a color copy printing process in the facsimile machine.

FIG. 10 is a flowchart showing a color copy output process in the shown embodiment of the facsimile machine.

The shown embodiment of the color copy process is initiated by setting a document in the ADF document table of the reading portion 102 and depressing the color mode key 135 and the start key 138.

When the color copy output process is initiated, at step S71, at first, the main device main control portion 101 transmits the trigger command to the printing device main control portion via the serial signal line 121. In response to this, the printing device main control portion 112 starts up the printing device portion for performing initialization. After completion of initialization, the initial set command for color data output is transmitted from the main device I/F portion 106 to the printing device I/F portion 113 via the Centronics line 120. The printing device main control portion 112 makes judgment of the command and performs initial setting for color data output.

Next, at step S72, the content of the error buffer to be used subsequently is set at the initial value 0. Further, at step S73, the document of the document table is fed for performing verging-up. Then, at step S74, by reading the document for one line by the reading portion 102, 24 bit data in total of R, G, B components is obtained to be stored in the read buffer (rgb_buf (rgb_cnt, r)) for each component of R, G, B (FIG. 6A). After reading of one line, transporting of the document for one line is performed. Next, at step S75, logarithmic conversion for data stored in the read buffer is performed. The result of the logarithmic conversion is stored in the converted read buffer (cmy_buf (cmy_cnt, q)) (FIG. 6B). Particularly, the conversion is performed through the foregoing formulae. Further, at step S76, the content of the error buffer (err_buf (cmy_cnt, q)) shown in FIG. 6C is added to the content of converted read buffer (FIG. 6B). By this process, the error caused in the binarization process in a former line can be diffused to the line next to the former line.

Next, at step S77, concerning data of each pixel stored in the converted read buffer, the production color at the smallest distance among the 8 kinds of the production colors of the production color table 2 shown in FIG. 9B is selected. As the production color table 2, one generated depending upon the color correction mode as set forth above is used. More specifically, the smallest value is selected among squared values of differences between the color component data for respective pixels stored in the converted read buffer and the color component data corresponding to respective 8 kinds of production colors. In other words, the production color tbl_cnt which is the smallest value selected among $$\Sigma^{cmy\_cnt=0-2}(cmy\_buf(cmy\_cnt,\ q)-CMY\_TBL(tbl\_cnt,\ cmy\_cnt))^2$$

Then, at step S78, a difference (cmy_buf(cmy_cnt, q)-CMY_TBL(tbl_cnt, cmy_cnt)) of the production color tbl_cnt selected at step S77 and the input color is stored in the error buffer. Further, at step S79, using the production color table 1 (FIG. 3A), the selected production color is converted into the output color component to be actually output to sequentially store in the printing buffer (wr_buf (clr_cnt, p)) for each pixel.

At step S80, it is checked whether process for the pixels in one line is completed or not. In not completed, the process is returned to the step S77 to repeat the binarization process. On the other hand, if completed, the process is advanced to step S81 to generate the color data output command by adding the header indicative of data amount to one line data of each color per color of the printing buffer to transmit to the printing device main control portion, and then copy printing for one line is performed.

Next, at step S82, check is performed whether copy output for read all lines is completed or not. If not completed, the process is returned to step S74 to repeat the subsequent process.

When copy output of all lines is completed, the document on the document table of the reading portion is discharged at step S83. Then, at step S84, the discharge command is transmitted to the printing device main control portion to perform discharge of the printed paper. Associating therewith, for the printing device main control portion 112, the termination command is transmitted to terminate output process of color copy.

It should be noted that, while the embodiment is explained in the case that a C, M, Y, color space is used as a color space of the color component, as apparent from above discussion, the color space is not limited to the C, M, Y space. It is apparent from the above discussion about an embodiment that a $L^*\ a^*\ b^*$ space, a $Y\ C_b\ C_r$ space or the like for example, may also be used as the color space of the color component.

(Second Embodiment)

Upon printing of the chart for color correction shown in FIG. 4, a second embodiment of the present invention performs printing of respective patches with a thinning ratio depending upon a kind of the printing paper used for printing the chart. Thereby, even when the read density of each patch tends to be high due to influence of ink absorbency of the printing paper, for example, the read density can be maintained at an appropriate value so that printing performed after the color correction process is made appropriate.

It should be noted that, in the shown embodiment, the construction similar to that of the machine and so on in the first embodiment and only color correction chart printing process is differentiated. Hereinafter, the shown embodiment of the color correction chart printing process will be explained.

In the shown embodiment, upon printing the patch as set forth above, thinning of the pixel is performed with a predetermined thinning ratio to print the patch with the thinned pattern. More specifically, thinning ratio data depending upon a kind of the printing medium to be used for printing of the patch is preliminarily set. According to the preliminarily set thinning ratio, the patch of the thinning pattern is printed in the color correction chart output process which will be explained later with reference to FIG. 13.

More particularly, the greater thinning ratio is provided for the printing medium having lower ink absorbency in the perpendicular direction to the paper surface. By this structure, while greater amount of a dye or a pigment of the ink may be remained on the surface of the printing medium due to low ink absorbency to increase density of the ink dot per se, or the dot size is increased for bleeding of the ink to increase density of the ink dot per se, increasing of density read as overall patches can be restricted because of presence of the thinned portion. As a result, even if the result of reading as is is reflected to the color correction process, printing can be performed on the data based on appropriate color correction in the subsequent printing operation. In the shown embodiment, printing after the color correction is performed by using the production color table the same as that set forth above in FIG. 9B. Therefore, if the density in the color correction process is read at higher density and such result is reflected to the content of the production color table, it may be possible that printing based on the result of reading can be performed with a color different from that should be. However, by the shown embodiment, such difference of printing color can be successfully avoided to perform printing with proper color balance. Also, such color correction per se can be made appropriate. In conjunction therewith, even if the printing medium having different ink absorbency from the printing medium used in printing the color correction chart, the relative color correction with respect to the printing medium can be made proper.

It should be noted that when the density of the patch becomes lower, measure can be taken by setting the duty ratio to be greater than or equal to 100% instead of performing thinning.

Further, the above-stated relationship between the printing medium and the thinning ratio can be determined with respect to respective printing medium so that the read densities between the printing media are equal.

Furthermore, while the foregoing explanation has been given for the case where the thinning ratio is set depending upon the kind of the printing medium, in addition thereto, the thinning ratio may be determined depending upon the duty ratio for printing the patch. For example, between the case where the patch where the duty ratio becomes 200%, such as blue, red, green and the like as the intermediate color, is printed and the case where the patch where the duty ratio becomes 100%, such as cyan, magenta, yellow and the like, is printed, the thinning ratio may be differentiated.

In respective patches set forth above with reference to FIG. 4, for example, when thinning ratio of the pixel is set at 100 steps per 1%, a square pattern of 10 pixels×10 pixels becomes one unit. Accordingly, in this case, the foregoing WR_LN becomes a multiple of 10 with respect to number of pixels.

Figure 12:
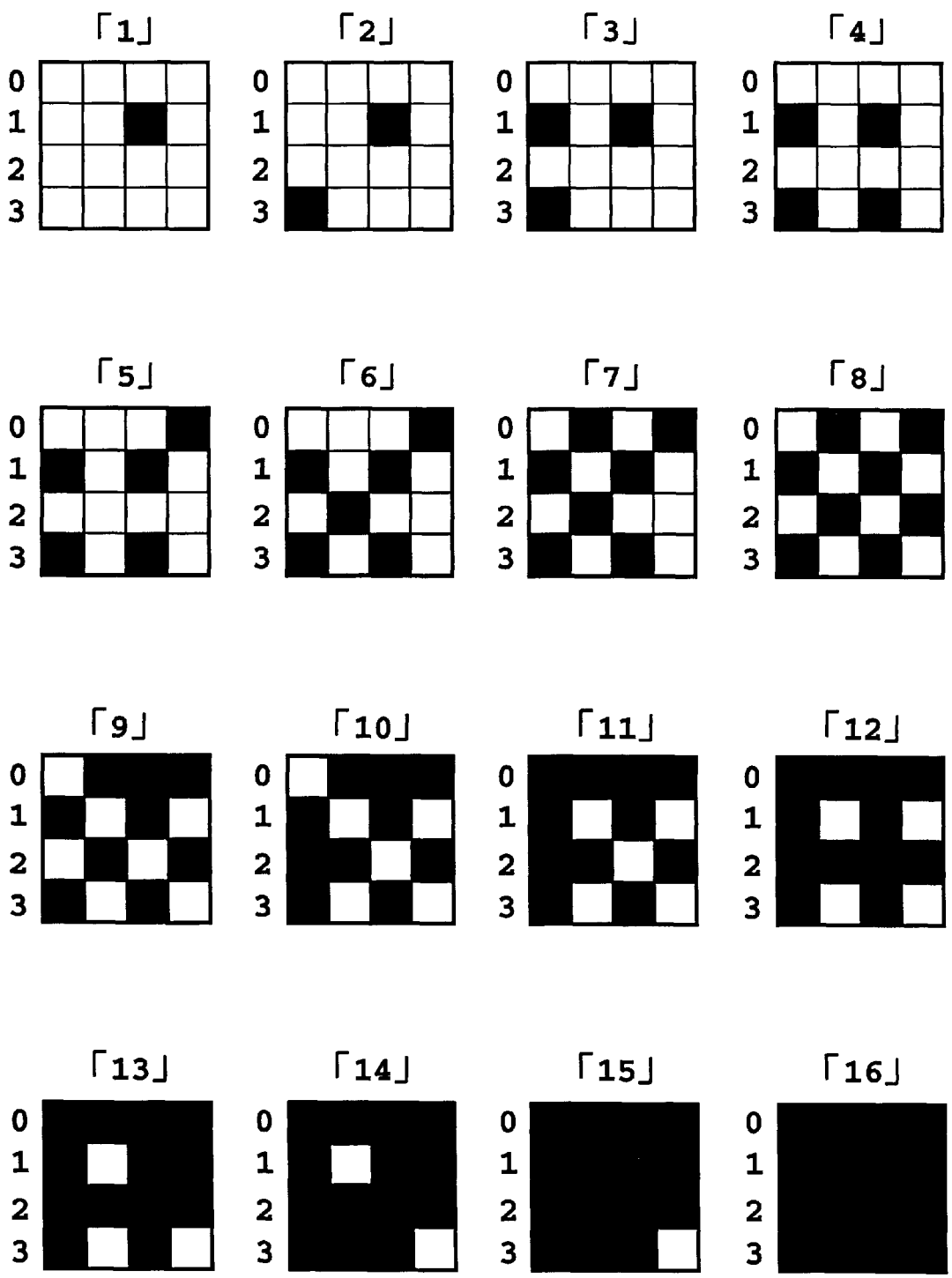
FIG. 12 is a diagrammatic illustration showing a thinning pattern in thinning printing of respective patches of a color correction chart according to a second embodiment of the present invention.

FIG. 12 is an illustration showing a thinning pattern employed in the shown embodiment.

In the shown embodiment, setting of the thinning ratio at 16 steps is performed. Therefore, a unit pattern consists of 4 pixels×4 pixels. Figures of "1" to "16" given for each pattern shown in the drawing, shows the duty ratio (actually the value derived by dividing the figure by 16 and expressed by %) of each pattern. These corresponds to thinning ratio of 15/16, 14/16, . . . 1/16, 0.

With respect to each pattern, the memory storing the printing data per a unit of byte is prepared for each row (ln) of 0 to 3 of FIG. 12. For example, in the case of the pattern expressed by "10", the printing data of the 0th row is not present, present, present, present. Therefore, the printing data has a pattern of (0111). Expressing this with 1 byte data, it becomes a pattern of (0X77). Similarly, the first to third rows respectively become (0Xaa), (0Xdd), (0Xaa).

Each pattern preliminarily stored in the memory as set forth above, is read by a function rand_tbl (ln, duty) as will be explained later in FIG. 13, to output. For example, in the case that the pattern is foregoing "10", 10 is set in "duty" of the foregoing function rand_tbl (in, duty), and the row number in is set to 0, (0X77) is output. On the other hand, when the row number ln is set to 1, (0Xaa) is output. In the case of greater than or equal to five lines, the pattern can be output using a remainder of division by 4. For example, in case of 10th line, since the remainder of 10/4 is 2, the function rand_tbl (ln, duty) outputs (0Xdd).

It should be noted that the pattern shown in FIG. 12 is 4 pixel×4 pixel. However, a number of pixels in vertical and lateral direction is not limited to 4 but can be any appropriate number.

Figure 13A:
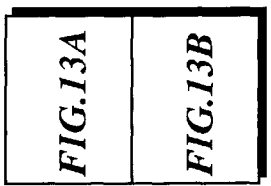
FIGS. 13A and 13B are a flowcharts showing a color correction chart printing process according to the second embodiment.
Figure 13A:
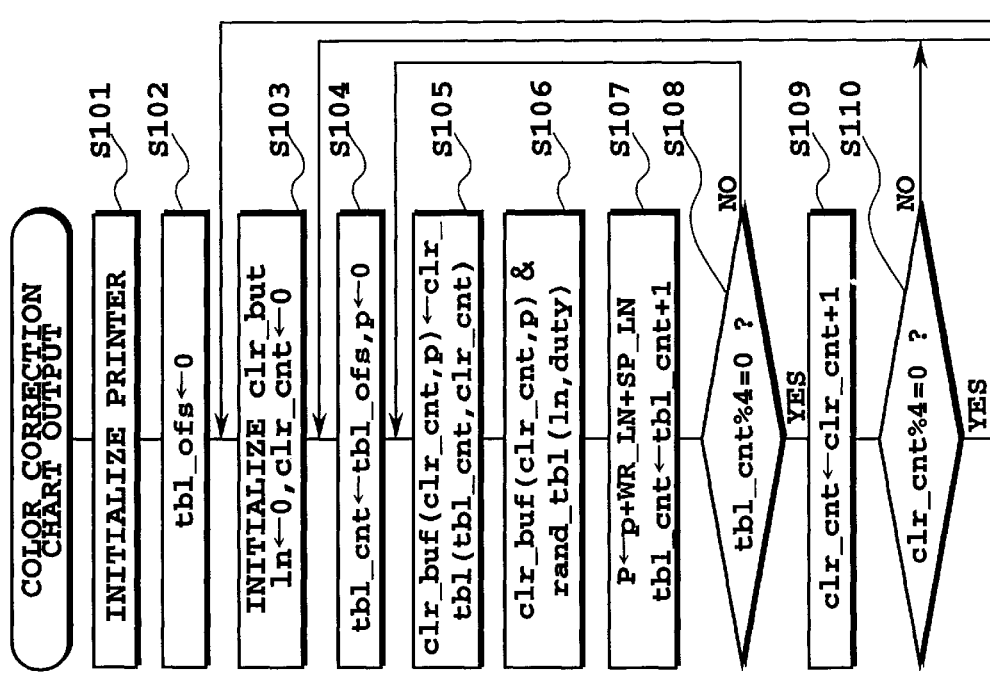
Figure 13B:
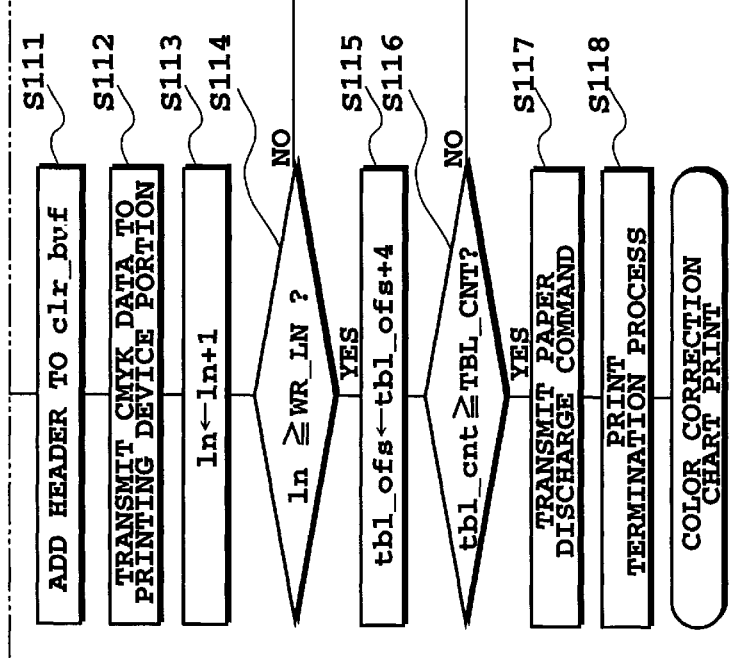

FIG. 13 is a flowchart showing a process of the shown embodiment of a color correction chart printing process. It should be noted, even in the shown embodiment, the same color correction chart as that shown in FIG. 4 is output. The process is differentiated from the former embodiment only in that the patches are printed with the thinning pattern explained above.

The print mode of the color correction chart is triggered by depressing the function key 141 and the predetermined ten-key 131, shown in FIG. 2. When the color correction chart output mode is triggered, at step S101, the main control portion 101 transmits the trigger command to the printing device main control portion 112 via the serial signal line 121. In response to the trigger command, the printing device main control portion starts up the printer to perform initialization. After completion of initialization, the initial set command for color data output is transmitted from the main device I/F portion 106 to the printing device I/F portion 113 via the Centronics line 120. The printing device main control portion 112 makes judgment of the initial set command to perform initial setting for color data output. It should be noted that, for this setting, initial setting of the tip end margin TOP_LN of the printing paper and the left end margin LEFT_LN of the printing paper shown in FIG. 4 is included.

Next, at step S102, the parameter tbl_ofs to designates the production color tbl_cnt and to be an address of the production color table 1 shown FIG. 3A is set at an initial value 0. At step S103, the contents clr_buf of the output buffer shown in FIG. 3B are all set to be 0. Further, a register ln storing a number of printing lines is set to be 0, and the output color component clr_cnt which is an address in the production color table 1 and the output color buffer is set to be initial value 0. The shown embodiment performs process of setting of the chart output data for each output color component. By these setting of the output color component clr_cnt, at first reading out of the production color table 1 and storing of the read out data in the output buffer are performed for cyan, and then magenta, yellow and black, sequentially.

Next, at step S104, a value of the production color tbl_cnt is set by a value of the production color designation parameter tbl_ofs. More, specifically, the value is initially set to be 0 and then, with respect to the production color of white, outputting from the output color table is performed. In addition, storing of the output data to the output buffer is performed. Associating therewith, the position p in the output buffer is set at the initial value 0.

Next, at step S105, the data clr_tbl (tbl_cnt, clr_cnt) obtained with taking the production color tbl_cnt and the output color component clr_cnt as addresses in the production color table 1 is read out. The read out data is then set at respective positions in a range of number of pixels WR_LN shown in FIG. 4, one end portion of which is a position (clr-cnt, p) identified by taking the output color component clr_cnt and the buffer position p as addresses in the output buffer. By this process, the output component data of cyan for one line of the patches 162 of white has been set.

Next, at step S106, as explained with reference to FIG. 12, the thinning pattern for printing the patch out from the memory by using the function rand_tbl (ln, duty) is read. More specifically, the parameter "duty" is selectively set by operation input in the operating portion 104 (see FIG. 1) from 16 step duty (see FIG. 12) depending upon the printing medium used for the chart output by the user. This selected "duty" is used as parameter "duty" of the function. The other parameter "ln" is the parameter ln, initial value of which is set at step S103. As can be clear from this arrangement, the parameter "ln" in the function corresponds to the printing line number of the patch.

Figure 14:
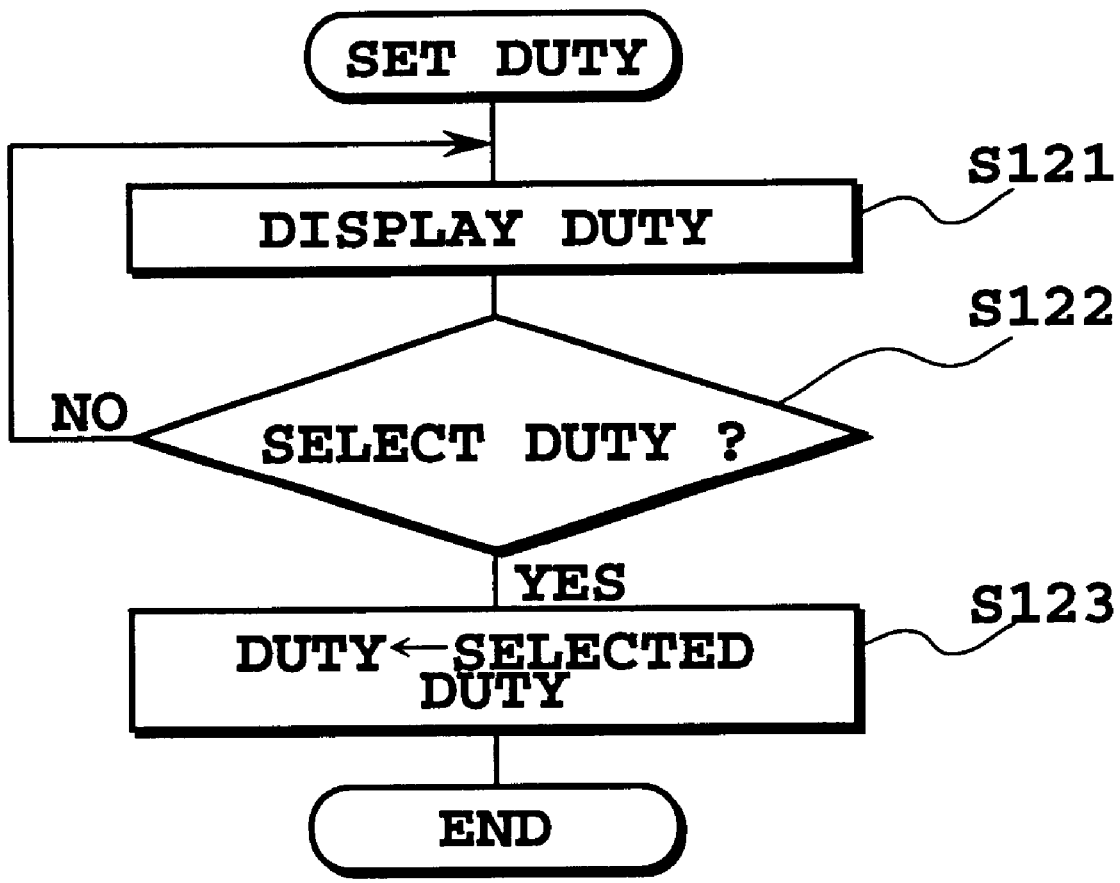
FIG. 14 is a flowchart showing a setting process of a parameter "duty" employed in the color correction chart printing process.

FIG. 14 is a flowchart showing a procedure of setting process of the parameter "duty". The shown procedure is performed before initiation of the process of the color correction chart printing. For example, in advance of triggering the chart printing process, the process is triggered automatically.

When the shown process is triggered, at step S121, the selected table 16 steps of duty value is displayed on the LCD 132 (see FIG. 2) of the operating portion, for example. The user selects one of these depending upon the printing medium to be used for printing the chart and inputs the selected value by means of the ten-key. By this input, judgment is made that selection of duty is performed (step S122), and the parameter "duty" is set as the data of the selected duty (step S123). Then, the shown process is terminated. It should be noted that, while the "duty" is directly input by manes of the ten-key in the above explanation, a menu of a plurality of values of "duty" corresponding to respective printing medium may be displayed and the user may select one value of the "duty" among the values of the menu, when generally used printing medium is used for printing the chart.

Further, at step S106, the function rand_tbl (ln, duty) outputs the printing data for one line in one of the patterns shown in FIG. 12 depending upon the set parameter "duty" and the printing line "ln", and then AND operation of the output printing data and the content of clr_buf (clr_cnt, p) stored at step S105 is performed to again store the result data of the AND operation in the same position of the output buffer. By this process, the data for the thinned patch output at the predetermined thinning ratio has been stored in the output buffer. It should be noted that, while the printing data is output by the function for 4 pixels in a line direction, at one time, AND operation can be performed by repeatedly outputting the printing data for 4 pixels until the output amount becomes WR_LN.

At step S107, by adding the number of pixels WR_LN and the number of white pixels SP_LN to the buffer position p, the buffer position p for setting output data of the production color is updated. In conjunction therewith, by adding 1 to the production color tbl_cnt, respective addresses of the production color table and the output buffer become that for next production color.

At step S107, judgment is made whether the production color tbl_cnt is divisible by 4. If not divisible, the process returns to step S105 to repeat the subsequent process until the production color tbl_cnt becomes divisible by 4. Namely, by this judgment step, with respect to the output color component of cyan, output data for one line of respective patches of white, yellow, magenta and red are set in the output buffer. On the other hand, when the production color tbl_cnt is divisible by 4, the process is advanced to step S109 to add 1 to the output color component clr_cnt for setting the output data for the next output color component. At step S110, judgment is made whether the output color component clr_cnt is divisible by 4 or not. If not divisible, the process is returned to step S104 to repeat the subsequent step until the output color component clr_cnt becomes divisible by 4. Namely, by this judgment step, for all of the output color components of cyan, magenta, yellow and black, setting of the output data for one line of respective patches of white, yellow, magenta, red is completed. On the other hand, when the output color component clr_cnt is divisible by 4, the process is advanced to step S111 to generate the color data output command derived by adding a header indicative of the data amount to data per each output color component of the content clr_buf of the output buffer set in the process up to the step S110, and at step S112, the color data output command for each output color thus generated is transmitted from the main control portion 101 to the printing device main control portion 112. Each color data output command thus transmitted is judged by the printing device main control portion 112 to print one line of color data by the printing head 117.

At step S113, a parameter in for counting the number of printed lines and for outputting the thinning data is incremented by 1. Then, at step S114, judgment is made whether the parameter in becomes greater than or equal to the number of pixels WR_LN or not. In this process judgment, when the parameter in is less than the number of the pixels WR_LN, the process is returned to step S104 to repeat the process up to the step S114 until it becomes greater than or equal to the number of pixels WR_LN. By this, printing of all lines of respective patch of white, yellow, magenta and red has been completed.

On the other hand, at step S114, when judgment is made that the parameter in becomes greater than or equal to the number of pixels WR LN, the process is advanced to step S115. At step S115, 4 is added to the production color designation parameter tbl_ofs for setting of the output data of the output color of cyan, green blue and black of the next row and for outputting these patches, and at step S116, judgment is made whether the production color tbl_cnt becomes greater than or equal to all output color number TBL_CNT. When the production color tbl_cnt is less than all output color number TBL_CNT, the process is returned to step S103 to repeat the subsequent process. By this process, setting of the output data of the output colors of cyan, green, blue and black of the second row of the chart set at step S110 and printing of the patch based on the setting are performed.

When judgment is made that the production color tbl_cnt is greater than or equal to the all output color number TBL_CNT, the process is advanced to step S117 to transmit a paper discharge command from the main control portion 101 to the printing device main control portion 112. The paper discharge command is judged by the printing device main control portion 112 to discharge the printing paper. Finally, at step S118, in order to terminate printing, a termination command is transmitted from the main control portion 101 to the printing device main control portion 112 via the serial signal line 121. In response to the termination command, the printing device main control portion 112 terminates printing to terminate output process of a sequence of color correction chart.

It should be noted that the image memory 109 has storage regions for storing each parameter production color designation parameter tbl_ofs, the printing line number (the parameter) ln, the output color component clr_cnt, the production color tbl_cnt, the duty and the buffer position p. On the other hand, the number of pixels WR_LN, the number of white pixels SP_LN between the respective patches of the production colors and the all output color number TBL_CNT are stored in ROM in the main device main control portion 101.

The processes of the color correction and the color copy on a basis of the color correction chart printing as set forth above are the same as those in the foregoing first embodiment.

It should be noted that the foregoing two embodiment has been explained in terms of the embodiments, in which the binary data of each output color is obtained using the production color table. However, the present invention is applicable for the construction specified in the shown embodiments but also for the case where the table from which multi value greater than 2, for example 3 or 4 is obtained may be employed.

<Other Embodiment>

The present invention is applicable not only for a system constituted of a plurality of devices (such as a host computer, an interface device, a reader, a printer and the like) but also to the devices (such as copy machine, facsimile machine).

Further, a system, in which program codes of software for realizing the foregoing functions in the embodiments are supplied to a computer within the machine or the system connected to various devices in order to operate various devices for realizing the function of the foregoing embodiment, and the various devices are operated by the programs stored in the computer (CPU or MPU) in the system or machine, is encompassed within the scope of the present invention.

Also, in this case, the program codes of the software per se performs the functions of the foregoing embodiment. Therefore, the program codes per se, and means for supplying the program codes to the computer, such as a storage medium storing, are encompassed within the scope of the present invention.

As the storage medium storing the program codes. floppy disk, a hard disk, an optical disk, a CD-ROM, a magnetic tape, a non-volatile memory card, ROM and the like can be used, for example.

In addition, the function of the foregoing embodiments is realized not only by executing the program codes supplied to the computer but also by cooperatively executing the program codes together with an OS (operating system) active in the computer or other application software. Such system is also encompassed within the scope of the present invention.

Furthermore, a system, in which the supplied program codes are one stored in a function expanding board of the computer or a memory provided in a function expanding unit connected to the computer, and then a part of or all of processes are executed by the CPU or the like provided in the function expanding board or the function expanding unit on the basis of the command from the program code, is also encompassed within the scope of the present invention.

As set forth above, according to the first aspect of the present invention, since printing of the predetermined output color is performed by the printing portion of the color copy machine, and the result of printing is read by the reading portion in the same machine to perform color correction by updating storage content of the table means to be used in color copy printing by the color spatial component data obtained from the result of reading, the image printed by the printing portion on the basis of the result of reading by the reading portion which has been subject to the color correction, may be read by the reading portion to achieve the result basically consistent with the foregoing result of reading. Also, according to the second aspect of the present invention, since printing of the predetermined production color for the color correction is performed at a preliminarily set printing density, even if the read density tends to be high due to influence of the printing medium, for example, an appropriate reading density can be attained by performing printing with lowered read density corresponding thereto. Thus, the storage content of the table means can be appropriately adjusted.

As a result, since the color correction of the color copy can be performed automatically, complicate color correction can be performed in a short period and easily. Also, even if the read density is differentiated depending upon the printing medium, proper color correction can be performed irrespective therewith.

It should be noted that the color correction by updating the data in the production color table 2 is performed depending upon the kind of the printing medium used for the color correction in the second embodiment set forth above. However, a plurality of the production color table 2 may be preliminary provided for respective kinds of printing medium, and then, at a printing operation (a copy operation), one production color table 2 may be selected in accordance with the printing medium selected for printing the color correction chart.

Further, the 8 colors of white, yellow, magenta, red, cyan, green, blue and black is used as the production color in the two embodiments set forth above. However, the production color is not limited to those colors. Any colors which is obtained by combining printing materials such as an ink or the like including the materials differing in density may be set as the production color. In this case, it is apparent that the production color tables 1 and 2, the CMY addition table and the CMY aggregation table are formed in accordance with the set production colors.

The present invention has been described in detail with respect to preferred embodiments, and it will now be apparent from the foregoing to those skilled in the art that changes and modifications may be made without departing from the invention in its broader aspect, and it is the invention, therefore, in the apparent claims to cover all such changes and modifications as fall within the true spirit of the invention.

What is claimed is:

1. An image processing method including a quantization process accompanied by an error diffusion process, said method comprising:
   a step of performing the quantization process on input color data;
   a step of outputting to a printing section as output color data the input color data which have been subjected to the quantization process;
   a step of, by using a table in which is stored print color data showing print colors to be formed with the output color data obtained by said step of performing the quantization process, obtaining a difference between the print color data and the input color data, as an error; and
   a step of adding the error to the other input color data,
   wherein the table is calibrated with a calibration process including:
      a step of causing the printing section to form print colors corresponding to the output color data;
      a step of measuring the formed print colors; and
      a step of updating the print color data stored in the table for obtaining the error, the print color data corresponding to the output color data for forming the print colors, based on measurement results obtained by said step of measuring.

2. An image processing method as claimed in claim 1, wherein the quantization process is a binarization process.

3. An image processing method as claimed in claim 1, wherein the quantization process includes a process wherein the input color data is converted to the output color data which has a minimum error distance from said input color data, in a color space.

4. An image processing method as claimed in claim 1, wherein the print colors are colors of white, yellow, magenta, cyan, red, green, blue and black.

5. An image processing method as claimed in claim 1, further comprising a step of printing out respective contents of the table before updating and after updating.

6. An image processing method as claimed in claim 1, wherein said step of forming the print colors causes the printing section to form the print colors with a predetermined print duty.

7. A color correction method as claimed in claim 6, wherein the printing section performs printing by ejecting an ink toward a printing medium.

8. An image processing method as claimed in claim 6, wherein the predetermined print duty is set depending upon a printing medium and/or a number of the print colors.

9. An image processing method as claimed in claim 6, wherein the predetermined print duty is set depending upon a hind of printing medium.

10. An image forming apparatus for executing an image processing process including a quantization process accompanied by an error diffusion process, said image processing process comprising:
    a quantizer, adapted to perform the quantization process on input color data;
    an outputter, adapted to output to a printing section as output color data the input color data which has been subjected to the quantization process;
    a difference obtaining unit, adapted to, by using a table in which is stored print color data showing print colors to be formed with the output color data obtained by said step of performing the quantization process, obtain a difference between the print color data and the input color data, as an error; and
    an adding unit, adapted to add the error to the other input color data,
    wherein the table is calibrated with a calibration process including:
       a step of causing the printing section to form print colors corresponding to the output color data;
       a step of measuring the formed print colors; and
       a step of updating the print color data stored in the table for obtaining the error, the print color data corresponding to the output color data for forming the print colors, based on measurement results obtained by said step of measuring.

11. An image forming apparatus as claimed in claim 10, wherein said step of forming the print colors forms the print colors with a predetermined print duty.

12. A storage medium storing a program which is readable by an information processing apparatus, the program including an image processing process, said process comprising:
    a step of performing the quantization process on input color data;
    a step of outputting to a printing section as output color data the input color data which has been subjected to the quantization process;
    a step of, by using a table in which is stored print color data showing print colors to be formed with the output color data obtained by said step of performing the quantization process, obtaining a difference between the print color data and the input color data, as an error; and
    a step of adding the error to the other input color data,
    wherein the table is calibrated with a calibration process including:
       a step of causing the printing section to form print colors corresponding to the output color data;
       a step of measuring the formed print colors; and
       a step of updating the print color data stored in the table for obtaining the error, the print color data corresponding to the output color data for forming the print colors, based on measurement results obtained by said step of measuring.

13. A storage medium as claimed in claim 12, wherein said step of forming the print colors causes forms the print colors with a predetermined print duty.

14. A computer program product embodying a program for executing an image processing process, said program product comprising:
    program code for a step of performing the quantization process on input color data;
    program code for a step of outputting to a printing section as output color data the input color data which has been subject to the quantization process;
    program code for a step of, by using a table in which is stored print color data showing print colors to be formed with the output color data obtained by said step of performing the quantization process, obtaining a difference between the print color data and the input color data, as an error; and
    program code for a step of adding the error to the other input color data,
    wherein the table is calibrated with a calibration process, program code for which includes:
       program code for a step of causing the printing section to form print colors corresponding to the output color data;
       program code for a step of measuring the formed print colors; and program code for a step of updating the print color data stored in the table for obtaining the error, the print color data corresponding to the output color data for forming the print colors, based on measurement results obtained by said step of measuring.

15. An image processing method including a quantization process accompanied by an error diffusion process, said method comprising:

a step of causing input color data to be subjected to the quantization process;

a step of outputting to a printing section as output color data the input color data which has been subjected to the quantization process;

a step of, by using a table in which is stored print color data showing print colors to be formed with the output color data obtained by the step of performing the quantization process, obtaining a difference between the print color data and the input color data, as an error; and a step of adding the error to the other input color data, wherein the table is calibrated with a calibration process including, a step of causing the printing section to form print colors corresponding to the output color data;

a step of measuring the formed print colors;

a step of updating the print color data stored in the table for obtaining the error based on measurement results obtained by the step of measuring; and a step of printing out respective contents of the table before updating and after updating.

* * * * *

UNITED STATES PATENT AND TRADEMARK OFFICE
CERTIFICATE OF CORRECTION

PATENT NO.     : 6,542,633 B1
DATED          : April 1, 2003
INVENTOR(S)    : Shinichiro Kori It is certified that error appears in the above-identified patent and that said Letters Patent is hereby corrected as shown below:

Column 7,
Line 54, "he" should read -- the --; and
Line 63, "tbl-cnt" should read -- tbl_cnt --.

Column 8,
Line 40, "clr-buf" should read -- clr_buf --.

Column 9,
Line 13, "is" should read -- are --.

Column 10,
Line 56, "in" should read -- 1n --.

Column 12,
Line 32, "a" should be deleted.

Column 13,
Line 50, "LN>2" should read -- LN×2 --; and
Line 60, "date" should read -- data --.

Column 16,
Line 34, "In" should read -- If --.

Column 18,
Line 26, "(in," should read -- (1n, --; and
Line 27, "in" should read -- 1n --.

Column 19,
Line 56, "manes" should read -- means --.

Column 20,
Lines 47, 50, 52 and 59, "in" should read -- 1n --; and
Line 60, "LN," should read -- _LN, --.

UNITED STATES PATENT AND TRADEMARK OFFICE
CERTIFICATE OF CORRECTION

PATENT NO. : 6,542,633 B1
DATED : April 1, 2003
INVENTOR(S) : Shinichiro Kori

It is certified that error appears in the above-identified patent and that said Letters Patent is hereby corrected as shown below:

Column 21,
Line 62, "codes." should read -- codes, --.

Column 22,
Line 6, "one" should read -- ones --; and
Line 35, "complicate" should read -- complicated --.

Column 23,
Line 51, "hind" should read -- kind --.

Column 24,
Line 42, "causes" should be deleted.

Signed and Sealed this

Thirteenth Day of July, 2004

JON W. DUDAS
*Acting Director of the United States Patent and Trademark Office*